(12) United States Patent
Jerez

(10) Patent No.: US 11,236,447 B2
(45) Date of Patent: Feb. 1, 2022

(54) LOAD-BEARING COMPOSITE PANELS, MATERIALS, PRODUCTS, AND PROCESSES TO MAKE AND USE SAME

(71) Applicant: Roberto Velozzi Jerez, Sherman Oaks, CA (US)

(72) Inventor: Roberto Velozzi Jerez, Sherman Oaks, CA (US)

( * ) Notice: Subject to any disclaimer, the term of this patent is extended or adjusted under 35 U.S.C. 154(b) by 0 days.

(21) Appl. No.: 15/269,604

(22) Filed: Sep. 19, 2016

(65) Prior Publication Data

US 2017/0226674 A1    Aug. 10, 2017

Related U.S. Application Data

(60) Provisional application No. 62/219,960, filed on Sep. 17, 2015.

(51) Int. Cl.
*D04H 1/70* (2012.01)
*B32B 5/02* (2006.01)
(Continued)

(52) U.S. Cl.
CPC .............. *D04H 1/70* (2013.01); *B32B 3/04* (2013.01); *B32B 3/12* (2013.01); *B32B 5/02* (2013.01);
(Continued)

(58) Field of Classification Search
CPC ... D04H 1/70; D04H 1/09; B32B 3/12; B32B 5/024; B32B 27/40
See application file for complete search history.

(56) References Cited

U.S. PATENT DOCUMENTS

| | | | |
|---|---|---|---|
| 6,743,497 B2 * | 6/2004 | Ueda | B32B 3/12 428/116 |
| 2005/0054830 A1 * | 3/2005 | Islam | C07K 14/43513 530/353 |

(Continued)

FOREIGN PATENT DOCUMENTS

| | | |
|---|---|---|
| CN | 108290368 | 7/2018 |
| EP | 3349981 | 7/2018 |

(Continued)

OTHER PUBLICATIONS

European Patent Office; PCT International Search Report, Issued in Connection to PCT/US2016/052522; dated Sep. 8, 2017; 6 pages; Europe.

(Continued)

*Primary Examiner* — Hai Vo
(74) *Attorney, Agent, or Firm* — Venable LLP; Keith G. Haddaway; Daniel M. Podgorski

(57) ABSTRACT

Load-bearing composite panels, materials, and products made by surrounding with a long fiber and/or fiber cloth reinforced polyurethane resin, an assembly containing one or more load-bearing members, graphene, a structural polyurethane/resin sandwich composite and/or spider silk protein fiber-cloth-continuous fibers. The composite structures can provide stronger, lighter-weight structural items such as vehicle floor and body panels, bullet-proof anti-ballistic panel products, vehicle bullet-proof anti-ballistic body panel structures and floors, bullet-proof vests, vehicle chassis, monocoque chassis, motor homes chassis-bodies, fuselage floors and frames for aircraft and/or UAV's, bicycle and motorcycle frames, wind turbine blades frames and structures, ship or boat haul body structures, shipment containers, pre-fabricated walls of buildings, train structure body or floor panels, solar panel supports, battery housings, mobile home walls, roof modules, truck beds, and truck trailer (Continued)

floors. Such composite panels, materials, and products can also be utilized in artificial organs, ligaments or tendons, artificial disc vertebrae, ropes, and 3D printing parts.

27 Claims, 15 Drawing Sheets

(51) Int. Cl.
| | | |
|---|---|---|
| *B32B 9/02* | (2006.01) | |
| *B32B 3/04* | (2006.01) | |
| *B32B 15/14* | (2006.01) | |
| *B32B 27/40* | (2006.01) | |
| *B32B 3/12* | (2006.01) | |
| *B32B 5/26* | (2006.01) | |
| *D04H 1/09* | (2012.01) | |

(52) U.S. Cl.
CPC .............. *B32B 5/022* (2013.01); *B32B 5/024* (2013.01); *B32B 5/26* (2013.01); *B32B 9/02* (2013.01); *B32B 15/14* (2013.01); *B32B 27/40* (2013.01); *D04H 1/09* (2013.01); *B32B 2250/40* (2013.01); *B32B 2260/021* (2013.01); *B32B 2260/046* (2013.01); *B32B 2262/0269* (2013.01); *B32B 2262/0276* (2013.01); *B32B 2262/0292* (2013.01); *B32B 2262/065* (2013.01); *B32B 2262/08* (2013.01); *B32B 2262/101* (2013.01); *B32B 2262/106* (2013.01); *B32B 2305/024* (2013.01); *B32B 2419/00* (2013.01); *B32B 2451/00* (2013.01); *B32B 2571/02* (2013.01); *B32B 2603/00* (2013.01); *B32B 2605/00* (2013.01); *B32B 2605/12* (2013.01); *B32B 2605/16* (2013.01); *B32B 2605/18* (2013.01); *B32B 2607/00* (2013.01); *Y02B 10/30* (2013.01)

(56) References Cited

U.S. PATENT DOCUMENTS

| | | | | |
|---|---|---|---|---|
| 2007/0082197 | A1* | 4/2007 | Ko | B82Y 30/00 428/367 |
| 2009/0130377 | A1* | 5/2009 | Samanta | C08J 5/045 428/113 |
| 2011/0052881 | A1* | 3/2011 | Netravali | B32B 9/02 428/178 |
| 2013/0295399 | A1* | 11/2013 | Schaefer | C08L 61/26 428/525 |
| 2015/0128335 | A1* | 5/2015 | Dehni | A41D 13/06 2/459 |
| 2017/0267806 | A1* | 9/2017 | Goeschel | C08G 18/58 |

FOREIGN PATENT DOCUMENTS

| | | |
|---|---|---|
| JP | 2013-96037 | 5/2013 |
| JP | 2018-531169 | 10/2018 |
| WO | 2004/001103 A2 | 12/2003 |
| WO | 2004001103 A2 | 12/2003 |
| WO | 2015/035068 A1 | 3/2015 |
| WO | 2015035068 A1 | 3/2015 |
| WO | 2017/112012 A2 | 6/2017 |

OTHER PUBLICATIONS

European Patent Office; PCT Written Opinion of the International Searching Authority, Issued in Connection to PCT/US2016/052522; dated Sep. 8, 2017; 10 pages; Europe.
European Patent Office; Communication Pursuant to Article 94(3) EPC, issued in connection to EP16854611.7; dated Mar. 20, 2019; 5 pages; Europe.
Japanese Patent Office; Office Action, issued in connection to JP2018-534469; dated Sep. 30, 2019; 2 pages; Japan.
China National Intellectual Property Administration; First Office Action, issued in connection to CN201680062158.9; dated Oct. 9, 2019; 19 pages; China.
China National Intellectual Property Administration; Search Report, issued in connection to CN201680062158.9; dated Oct. 9, 2019; 4 pages; China.

* cited by examiner

LOAD-BEARING COMPOSITE PANELS, MATERIALS, PRODUCTS, AND PROCESSES TO MAKE AND USE SAME

RELATED APPLICATIONS

This application claims priority to U.S. provisional application Ser. No. 62/219,960, filed on Sep. 17, 2015, the entire contents of which are incorporated herein by reference.

FIELD OF INVENTION

Embodiments of the invention relate to panels, materials, product made with, and out of, spider silk fiber and/or spider silk protein, such as load-bearing composite panels, materials, and products made by surrounding them with short or long fiber and/or spider silk fiber, long-continuous fiber-cloth-proteins reinforced polyurethane resin, an assembly containing one or more load-bearing members, graphene, a structural polyurethane/resin sandwich composite and/or a spider silk proteins-fiber-cloth-continuous fiber. Such load-bearing composite panels, materials, and products can be utilized in vehicle construction, vehicle body panels, bullet-proof anti-ballistic panels or other products, vehicle bullet-proof anti-ballistic body panels, structures and floors, tires, wheels, bullet-proof vests, vehicle chassis structures, monocoque chassis, motor home chassis bodies, fuselages, floors and frames for aircraft including unmanned air vehicles ("UAV's") such as drones, bicycle frames, bicycle and motorcycle frames, wind turbine blade frame structures, ship and boat haul body structures, submarines body structures, shipment containers, pre-fabricated walls and associated structures of homes and other buildings, train structures and body panels and/or floor panels, solar panel supports, battery housings, walls for mobile homes, roof modules, truck beds, truck trailer floors and the like. Such composite panels, materials, and products made with, or out of, spider silk fibers and/or spider silk proteins can also be utilized in artificial organs, ligaments or tendons, artificial disc vertebrae, ropes, brushes, sails and 3D printed parts. Another component of the field of invention is the creation of products composed of a mixture of spider silk fibers and proteins with polyurethanes, polypropylenes, ABS (acrylonitrile butadiene styrene polymer), polylactic acid (PLA), resins, cosmetics, soaps, paints adhesives, glues, coatings, films, 3D printing materials, any plastic or any chemicals in general.

BACKGROUND OF INVENTION

Vehicle panels and structural components (including those used to form cars, trucks, trains, aircrafts, watercrafts, ships and the like) oftentimes must endure a variety of structural stresses caused by the vehicle's movement over streets, highways, water, air and uneven terrain. One desirable quality of these panels is light weight to improve the vehicle's fuel efficiency. However, this lighter weight can, and frequently does, militate against the strength necessary to tolerate the structural stresses encountered. Others have attempted to provide vehicle panels, components, and/or structures which can meet the frequently competing attributes of structural strength and lightweight. For example, U.S. Pat. No. 6,854,791, issued to Jaggi ("Jaggi"), teaches a vehicle cell made of reinforced thermopolymer material which includes a shape-defining, long-fiber-reinforced thermopolymer matrix with integrated continuous fiber strands or strips. A base structure includes a base plate, uninterrupted continuous fiber strands running longitudinally in an upper base area and continuous fiber strands running longitudinally in a lower base area. The upper and the lower base areas are connected with vertical walls. Further, U.S. Pat. No. 6,299,246, issued to Tomka ("Tomka"), discloses a polymer molding and design structure that has a load-bearing structure, which is wholly or partly surrounded by a polymer material forming the molding. The load-bearing structure of Tomka is formed from several interconnected, high strength, continuous fiber-reinforced structural elements. Tomka states that Tomka invention makes it possible to produce structures with the most varied shapes such as containers, tanks, vehicle frames, etc. in a simple and inexpensive manner. Further, U.S. Pat. No. 4,405,752, issued to Recker, et al. ("Recker '752"), provides a process for the production of fiber-reinforced molded products, involving combining two specific isocyanates and specific isocyanate-reactive components and adding a fiber material having a fiber length of from 10 to 100 mm. U.S. Pat. No. 4,336,180 issued to Recker, et al. ("Recker '180"), teaches a substantially solvent-free molding material which is obtained from a pre-polymer and 5 to 69% by weight of an organic or inorganic fibrous material with a fiber length of from 0.1 to 100 mm. Further, United States Patent Appl. Publ. No. 2012/0159786, to Pyles et al. ("Pyles"), teaches an automated process for the production of polyurethane wind turbine blades and other large objects. The process involves forming a mold for the polyurethane wind turbine blade at a wind farm site, injecting an isocyanate and an isocyanate-reactive component with an automated reaction injection molding machine into the mold, closing, pressing, and heating the mold to cure the resulting polyurethane and installing the polyurethane in the wide turbine. Further, U.S. Pat. No. 8,668,988, issued to Schoots et al., teaches an polyurethane panel with purported improved characteristics (such as strength, compressibility, flexibility, or resistance) that includes a prefabricated polyurethane panel, an applied coating (a polyurethane elastomer with one or more polyols and one or more diisocyanate). United States Patent Appl. Publ. No. 2007/0160793, to Cageao et al. (hereafter referred to as "Cageao") (which is attached hereto at Attachment A), discloses load-bearing panels for inclusion in vehicles which are made by surrounding a load-bearing composite panel with a long fiber reinforced polyurethane and an assembly made from one or more load-bearing members and a structural polyurethane sandwich composite.

These materials and products still exhibit some drawbacks, thus, a need persists in the art for strong, yet lightweight load-bearing panels, materials, and products that are suitable for inclusion in vehicles. The need likewise persists in the art for strong, yet lightweight load-bearing panels, materials, and products that are suitable for inclusion in other uses, such as pre-fabricated walls-homes-buildings, anti-ballistic structures, solar panels-support, battery housings, artificial organs, ligaments or tendons, artificial disc vertebrae, ropes, and 3D printed parts.

SUMMARY OF INVENTION

Some embodiments of the invention a silk fibroin composite comprising a plurality of coupled layers where at least one of the layers includes a composite matrix of non-silk polymer and/or silk fibroin material derived at least in part from expression of one or more spider silk genes within at least one living organism. The plurality of coupled layers comprise at least one backing or surface layer, and at least one layer including a plurality of cells that is coupled to the at least one backing or surface layer, and at least one of the plurality of coupled layers includes a material that is fibrous.

In some embodiments, the silk fibroin material includes silk fiber and/or silk polypeptides in a non-fibrous form. In some embodiments, the non-silk polymer includes a thermoplastic polymer and/or a thermoset polymer. In some embodiments, the plurality of coupled layers includes polyurethane polymer, a polycarbonate polymer, a polypropylene polymer, an acrylonitrile butadiene styrene (ABS) polymer, a polylactic acid (PLA) polymer, a polyamide (nylon) polymer, a glass-filled polyamide polymer, an epoxy resin, silver, gold, titanium, steel, stainless steel, wax, a photopolymer, high density polyethylene (HDPE), polycarbonate-acrylonitrile butadiene styrene (PC/ABS) polymer, and/or polyphenylsulfone (PPSU) polymer.

In some embodiments of the invention, the non-silk polymer comprises polyurethane reaction product of one or more isocyanates and at least one isocyanate-reactive component. In some further embodiments, the silk fibroin material forms at least a portion of the composite matrix of at least one of the at least one backing or surface layer and the at least one layer.

In some embodiments, the silk fibroin material includes a plurality of long fibers of varying lengths and/or a plurality of short fibers comprised of a variety of lengths. Further, the long fibers have lengths of more than 3 mm and the short fibers have lengths less than the shortest of any of the lengths of the plurality of long fibers. In some embodiments, the long fibers make up 0.5 wt. % to 99 wt. % of the combined weight of the plurality of coupled layers.

In some embodiments, the silk fibroin material comprises electro-spun silk. In some embodiments, the silk fibroin material includes silk weave or cloth, silk fiber, silk mat. In some embodiments, the plurality of cells comprises a honeycomb-like structure. In some embodiments, at least a portion of the composite matrix is derived by injection molding, reaction-injection molding, chopped-fiber injection, extrusion, molding, film casting, web coating, spray-coating, weaving, vacuum injection, or 3D printing.

In some embodiments, at least a portion of the plurality of coupled layers includes a fibrous material that includes at least one of a silk fiber, a silk weave or cloth, and a silk mat. In some embodiments, the plurality of coupled layers is an article of manufacture selected from a land vehicle frame, an air vehicle frame, a sea vehicle frame, a land vehicle panel, an air vehicle panel, and a sea vehicle panel. In some further embodiments, the article of manufacture includes at least one of a load-bearing structure, non-load-bearing structure, and a decorative or aesthetic structure.

Some embodiments include a method of making a silk fibroin composite comprising providing at least one non-silk polymer and silk fibroin material derived at least in part from expression of one or more spider silk genes in at least one living organism, and combining at least a portion of the silk fibroin material and the at least one non-silk polymer material to form a mixture. The method includes forming a composite matrix from at least a portion of the mixture using a process of injection molding, reaction-injection molding, chopped-fiber injection, extrusion, molding, film casting, web coating, spray-coating, weaving, vacuum injection, and 3D printing. The method includes forming a plurality of coupled layers using at least a portion of the composite matrix. The plurality of layers comprises at least one backing or surface layer and at least one layer including a plurality of cells. The at least one layer is coupled to the at least one backing or surface layer, and the at least one of the plurality of coupled layers includes a material that is fibrous.

In some embodiments, the silk fibroin material includes at least one of a plurality of long fibers of varying lengths and a plurality of short fibers comprised of a variety of lengths. In some embodiments, the long fibers have lengths of more than 3 mm and the short fibers have lengths less than the shortest of any of the lengths of the plurality of long fibers. In some embodiments, the long or short fibers include at least one of a silk fiber, a silk weave or cloth, and a silk mat.

In some embodiments, the plurality of coupled layers is an article of manufacture selected from a land vehicle frame, an air vehicle frame, a sea vehicle frame, a land vehicle panel, an air vehicle panel, and a sea vehicle panel. In some embodiments, the article of manufacture includes at least one of a load-bearing structure, non-load-bearing structure, and a decorative or aesthetic structure.

Some embodiments include a method of making a silk fibroin composite comprising feeding a silk fibroin material into an extruder, where the silk fibroin material is derived at least in part from expression of one or more spider silk genes in at least one living organism. The method includes extruding a silk fiber precursor from the silk fibroin material, passing the silk fiber precursor through a coagulation bath at one end of the coagulation bath, forming a silk fiber from the silk fiber precursor through coagulation in the coagulation bath, and stretching at least a portion of the silk fiber using at least one set of godets. The further includes combining at least a portion of the silk fiber with at least one non-silk polymer material to form a feedstock, and using the feedstock, forming a composite matrix using an injection molding, reaction-injection molding, chopped-fiber injection, extrusion, molding, film casting, web coating, spray-coating, batch mixing, weaving, vacuum injection, and/or 3D printing.

Some embodiments of the method include forming a plurality of coupled layers using at least a portion of the composite matrix. The plurality of layers comprising at least one backing or surface layer and at least one layer including a plurality of cells. The at least one layer is coupled to the at least one backing or surface layer.

Some embodiments of the method include a composite matrix that includes at least one of a plurality of long fibers of varying lengths and a plurality of short fibers comprised of a variety of lengths. The long fibers have lengths of more than 3 mm and the short fibers have lengths less than the shortest of any of the lengths of the plurality of long fibers. In some embodiments, the long fibers make up 0.5 wt. % to 99 wt. % of the combined weight of the composite matrix.

In some embodiments, the plurality of cells comprises a honeycomb-like structure. In some embodiments, the honeycomb-like structure includes a structural core including at least one of an aluminum core, a foam core, a wood core, and a carbon-fiber core.

Some embodiments further comprise mixing the feedstock with another feedstock selected from a soap material, a cosmetic material, or a paint material.

DESCRIPTION OF THE DRAWINGS

For better understanding of the embodiments described herein, and the advantages thereof, reference is now made to the following descriptions taken in conjunction with the accompanying drawings.

DETAILED DESCRIPTION

Figure 1:
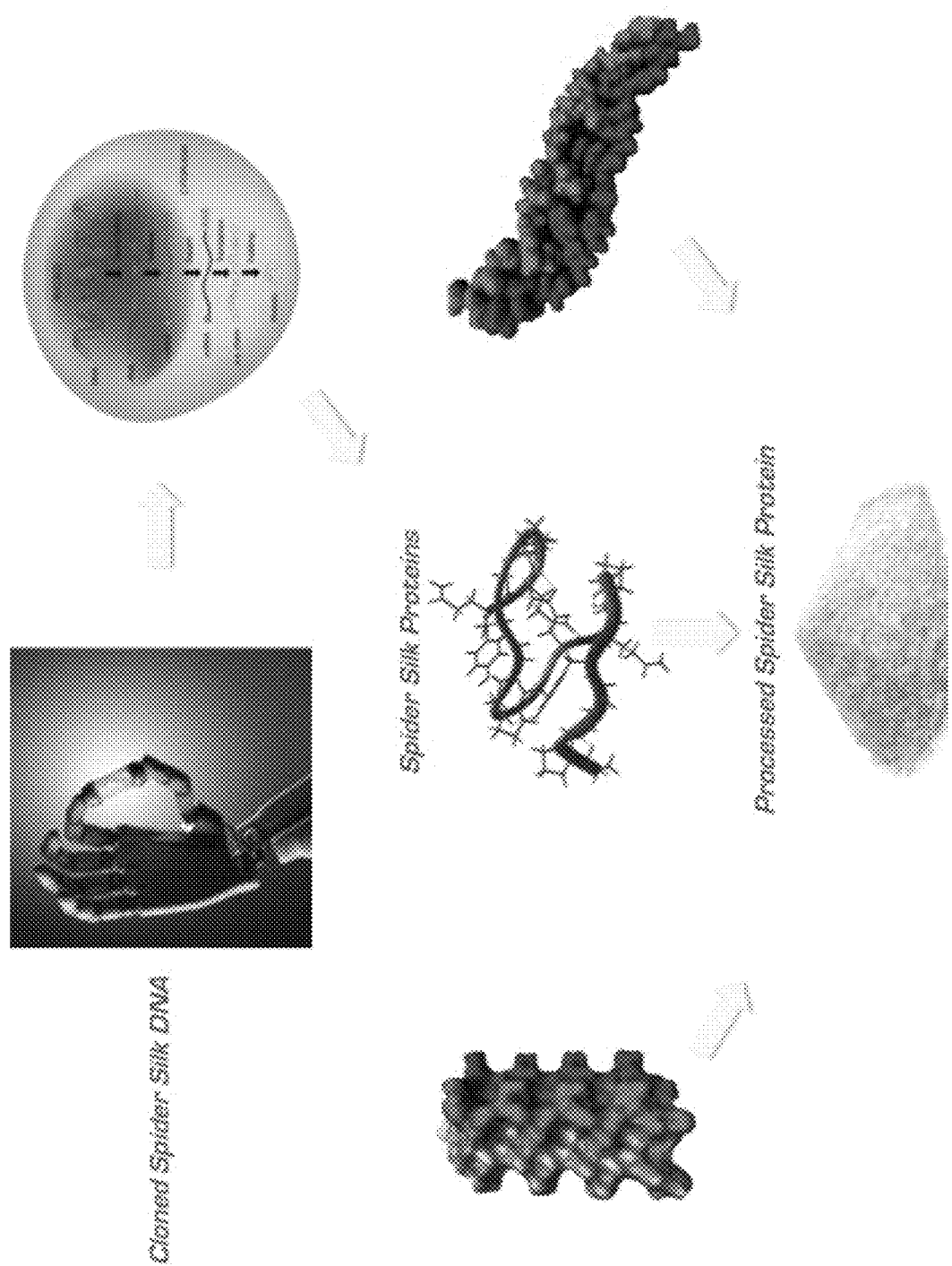
FIG. 1 illustrates a fermentation process to make spider silk proteins.

Some embodiments include materials, structures, and articles of manufacture including silk fibroin material derived at least in part from expression of one or more spider silk genes within at least one living organism. As used herein, the silk fibroin material can be any silk fiber and/or silk protein derived from the expression of the one or more spider silk genes, and the term spider silk fiber and/or spider silk protein is used herein to define the silk fibroin material. Some embodiments of the invention include load-bearing panels, materials, and products made with, and out of, spider silk fiber and/or spider silk protein, such as load-bearing composite panels, materials, and products made by surrounding them with short or long fiber and/or spider silk long-continuous fiber-cloth-proteins reinforced polyurethane resin, an assembly containing one or more load-bearing members, graphene, a structural polyurethane/resin sandwich composite and/or spider silk proteins-fiber-cloth-continuous fiber. Some embodiments of the invention provide such panels, materials, and products, and also processes for their production. The inventive load-bearing composite panel, materials, and products can be made by surrounding with a continuous spider silk fiber and/or spider silk cloth and/or long fiber reinforced polyurethane resin an assembly made from one or more load-bearing members and a structural polyurethane and/or resin sandwich composite. Some embodiments of the lightweight inventive panels, materials, and products have greater bending and buckling strength than the sum of the individual components due to the physical properties of the continuous spider silk fiber and/or spider silk cloth and/or long fiber reinforced polyurethane.

Some embodiments of the inventive composite panels, materials, and products can find use in such items as automobile floor panels, vehicle body panels, bullet-proof anti-ballistic panel products, vehicle bullet-proof-anti-ballistic body panel structures and floors, bullet-proof vests, vehicle chassis structures, monocoque chassis, motor home chassis bodies, fuselages, floors and frames for aircraft and/or UAV's, bicycle and motorcycle frames, wind turbine blade frame structures, ship and boat haul body structures, submarines body structures, shipment containers, pre-fabricated walls and associated structures of homes and other buildings, train structures and body panels and/or floor panels, solar panel supports, battery housings, walls for mobile homes, roof modules, truck beds, truck trailer floors and the like. Such composite panels, materials, and products made with, or out of, spider silk fibers and/or spider silk proteins can also be utilized in artificial organs, ligaments or tendons, artificial disc vertebrae, brushes, ropes, and 3D printed parts.

In some embodiments, the spider silk proteins and fibers can be mixed with resins, chemicals, films, etc. to improve the chemical and/or mechanical properties of different components-technologies. In some embodiments, the spider silk proteins and fibers can be used to prepare glues or adhesives, either alone or in combination with other chemical additives. In some further embodiments, the spider silk proteins and fibers can be used to prepare soaps, cosmetics, paints and other coatings, either alone or in combination with other chemical additives.

The panels, materials, and products of some embodiments of the invention can be combinations of existing fibers (such as carbon fiber, fiberglass, natural fibers, Kevlar) that are combined with spider silk fiber. In some embodiments, the spider silk proteins and/or fibers are mixed with resins, polyurethane, and other chemicals.

In some embodiments, such panels, materials, and products can be made with only the pure fibers spider silk fibers themselves or combined with the other fibers.

In some embodiments, the spider silk fibers by themselves (or combined with fibers of other materials) can be combined with honeycomb cores (such as aluminum, Kevlar, carbon fiber, Nomex, cardboard, and polypropylene) or other natural fiber cores.

In some embodiments, spider silk fibers and proteins are combined with chemicals, composites, and thermosets to improve their mechanical properties.

In some embodiments, spider silk fibers and proteins are used as additives in materials such as acrylonitrile butadiene styrene (ABS), polycarbonate (PC), polylactic acid (PLA), polyamide (nylon), glass-filled polyamide, stereo lithography materials (epoxy resins), silver, gold, titanium, steel, stainless steel, wax, photopolymers, high density polyethylene (HDPE), PC/ABS, and polyphenylsulfone (PPSU).

"Spider silk" as used herein refers to fiber or protein materials that can be created by spiders but can (and are) also artificially manufactured. U.S. Patent Appl. Publ. No. 2013/0212718 to Fraser et al. teaches chimeric spider silk and uses thereof. U.S. Patent Appl. Publ. No. 2015/0047532 to Lewis et al. teaches synthetic spider silk protein compositions and methods (which includes mixing recombinant spider silk proteins with water to form a mixture and hearing the mixture in a closed vessel to form a solution). U.S. Patent Appl. Publ. No. 2015/0202651 to Lewis et al. teaches a method of forming recombinant spider silk protein films.

For instance, protein samples of spider silk ("spider silk protein") can be made via a fermentation process, such as shown in FIG. 1. Cells or bacteria containing the spider silk genes in their DNA (spider silk closed DNA) can be placed in a fermentation tank, and the spider silk protein is produced through a fermentation process, and the spider silk proteins extracted using a high-pressure bacterial cell lysis process, or any other conventional bacterial cell lysis process.

Figure 2A:
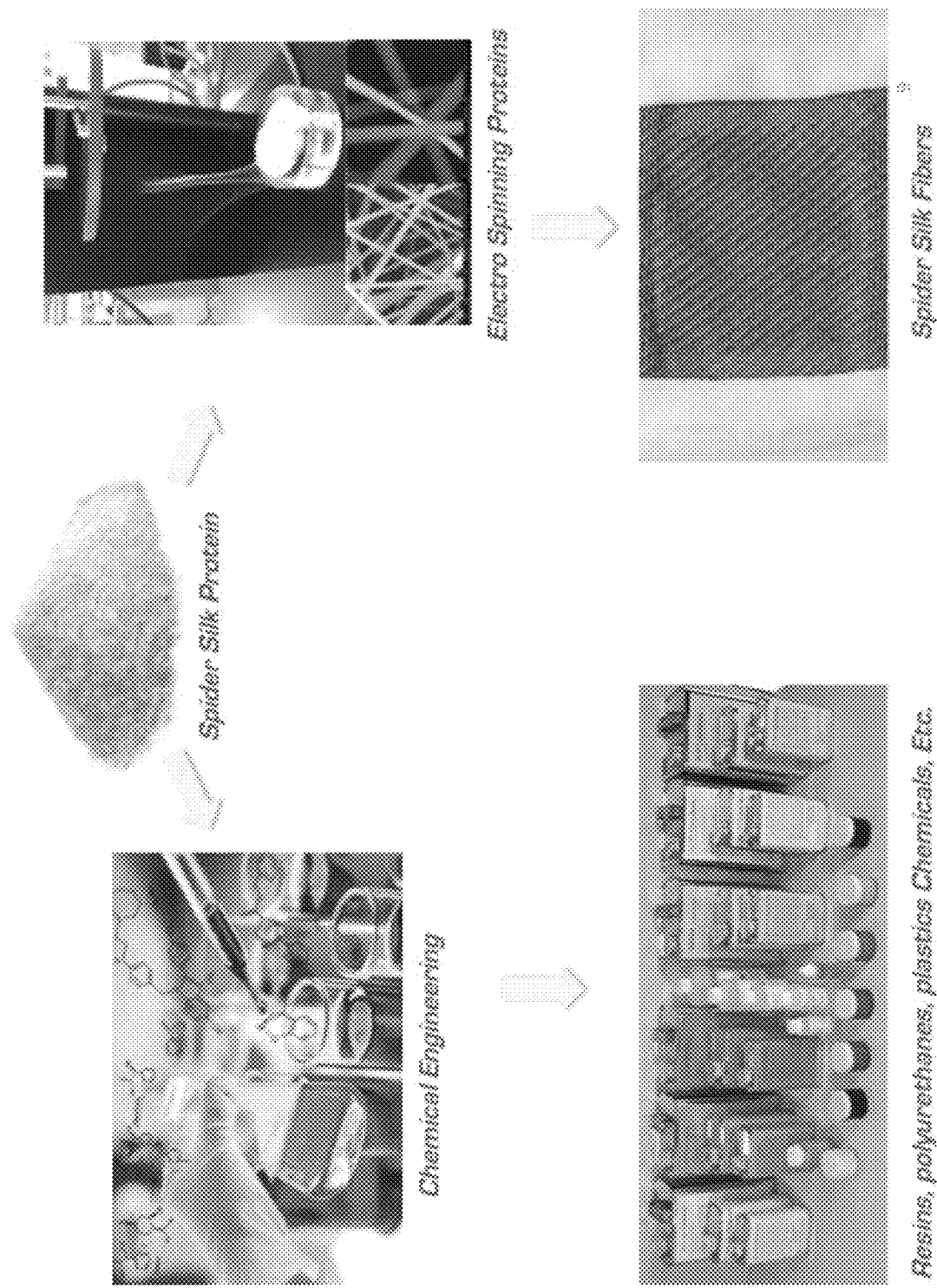
FIG. 2A illustrates processes utilizing spider silk protein, such as electro-spinning the proteins and chemical processing involving the spider silk proteins.

As shown in FIG. 2A, fibers of spider silk ("spider silk fibers") can be made from the spider silk protein, For instance, the spider silk proteins can be processed and dried, and then electro-spun in an aqueous solution. As also shown in FIG. 2A, these spider silk proteins can be processed and dried and then are used as an additive in chemicals-plastics-composites (such as resins, polyurethanes, and other conventional polymers, etc.) to improve their mechanical properties.

Figure 2B:
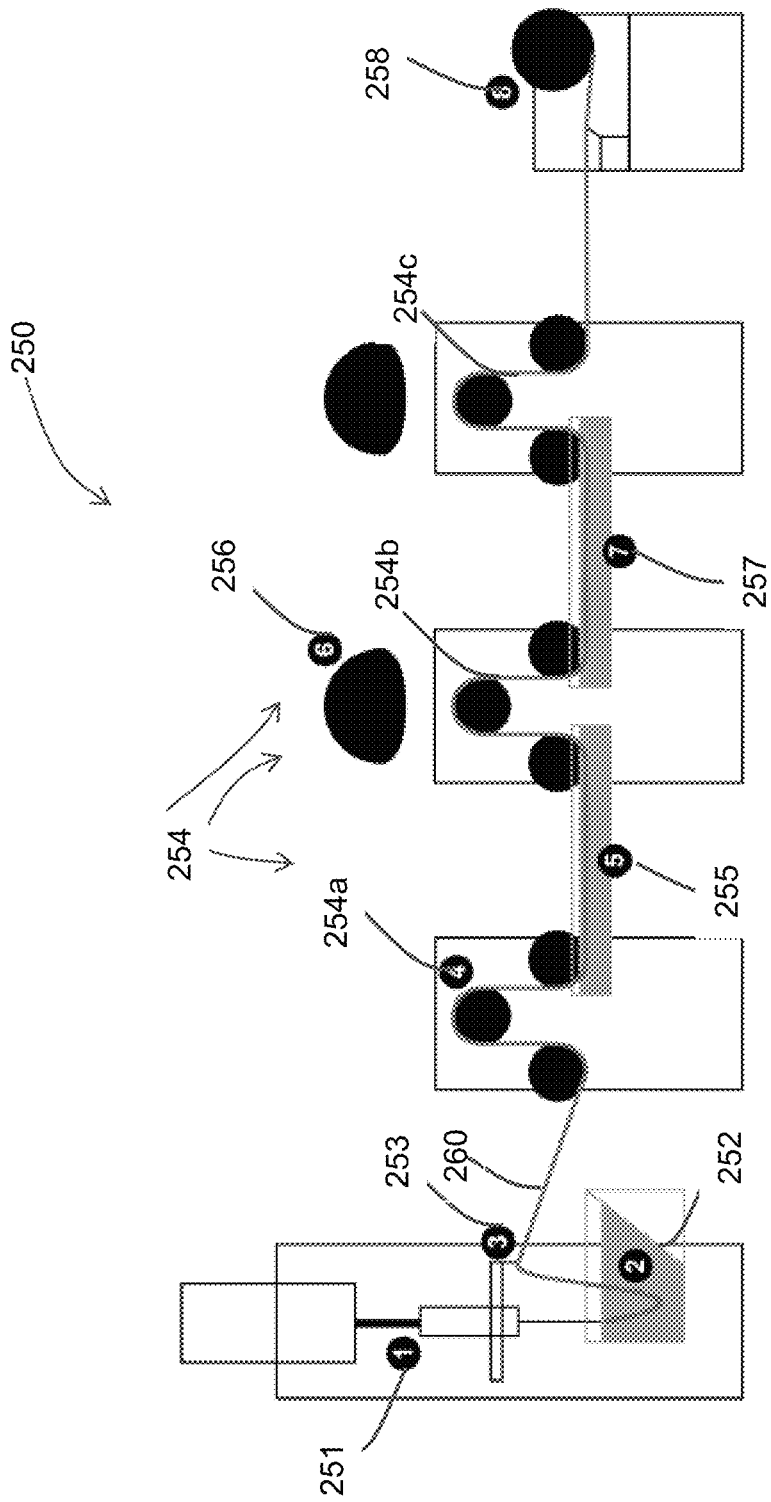
FIG. 2B illustrate a process utilizing spider silk protein and/or spider silk to prepare spider silk fiber used in at least one embodiments of the invention described herein.

FIG. 2B illustrates a process 250 utilizing spider silk protein and/or spider silk to prepare spider silk fiber used in at least one embodiments of the invention described herein. In some embodiments of the invention, a piston/extruder 251 can be used to extrude spider silk spin dope. In some embodiments, constant pressure can be applied to the spin dope to extrude a silk fiber 260 into a coagulation bath 252. In some embodiments, isopropanol (or other solvents) can be used to help with fiber formation and to extract solvents used in the spin dope. In some embodiments, using a Teflon® brand or other low friction material guide 253, the fiber 260 can be fed to one or more godets 254 (shown as 254a, 254b, 254c) that are sets of wheels that spin in synchronization along which the fiber runs). In some embodiments, one or more sets of godets 254 can be programmed to rotate at different speeds independently and this allows stretch to be applied to the fiber 260. Further in some embodiments, a stretch bath 255 can be used as the fiber 260 is stretched by a difference in speed between two or more godets 254, and the fiber 260 can run through a stretch bath 255 to aid in protein motif formation and alignment. In some embodiments, a drying unit 256 can be used with either heat or a slight air current, and the solvents used in the stretch bath can be driven off prior to entering the water bath or before going into the winder. In some embodiments, using a water bath 257, the fiber 260 can run through water or a water/alcohol or water/salt mix to further strengthen and align the fiber 260. In some embodiments, a stretch can also be applied here between the second and third godet sets (254b, 254c). Finally, a winder 258 can be used so that the fiber 260 is guided for collection. Other embodiments can use more or less godets 254 and more or less numbers and types of baths 255, 257.

Figure 3:
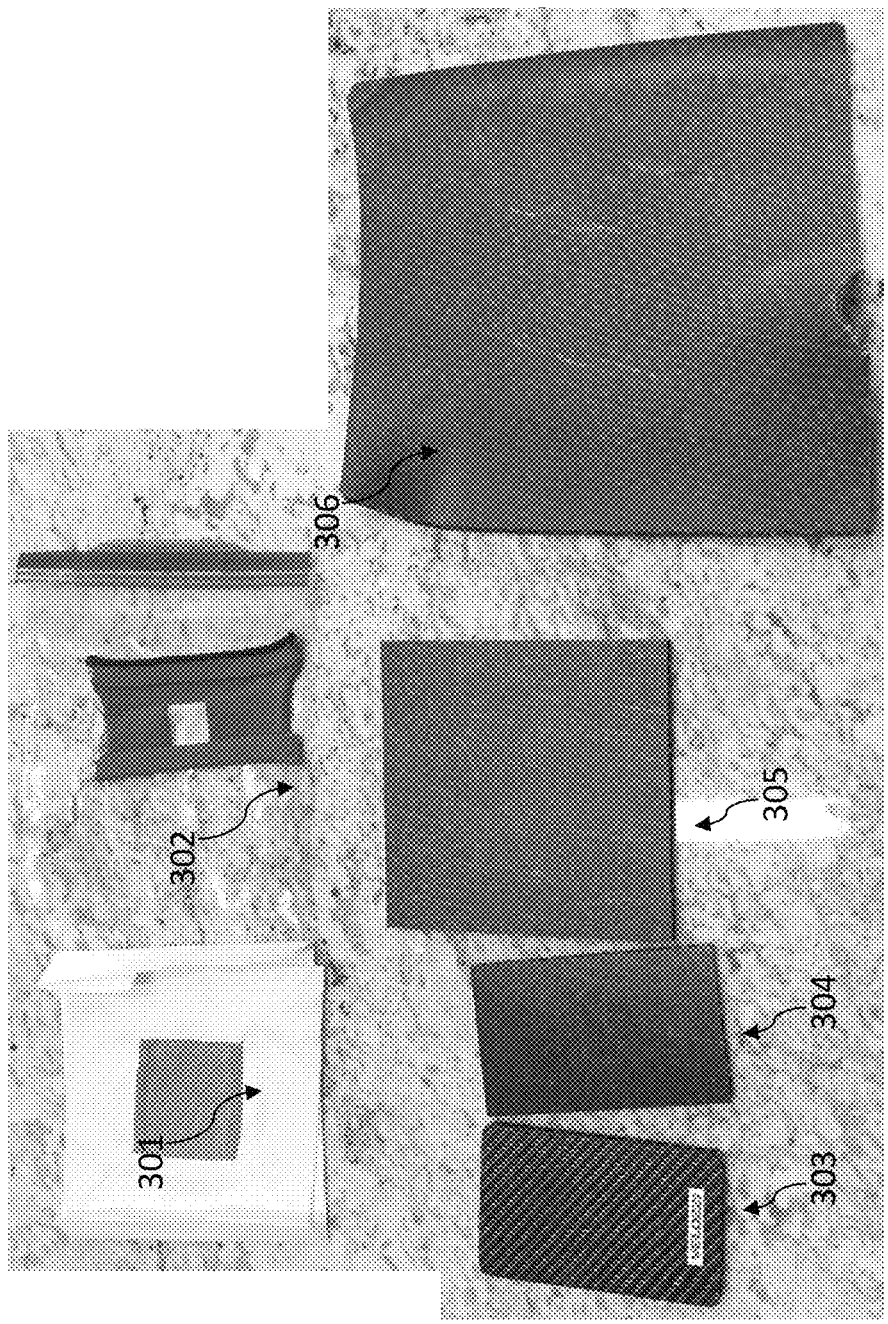
FIG. 3 shows a photograph showing (a) samples of spider silk materials; and (b) honeycomb materials that have spider silk materials incorporated therein in accordance with some embodiments of the invention.
Figure 4:
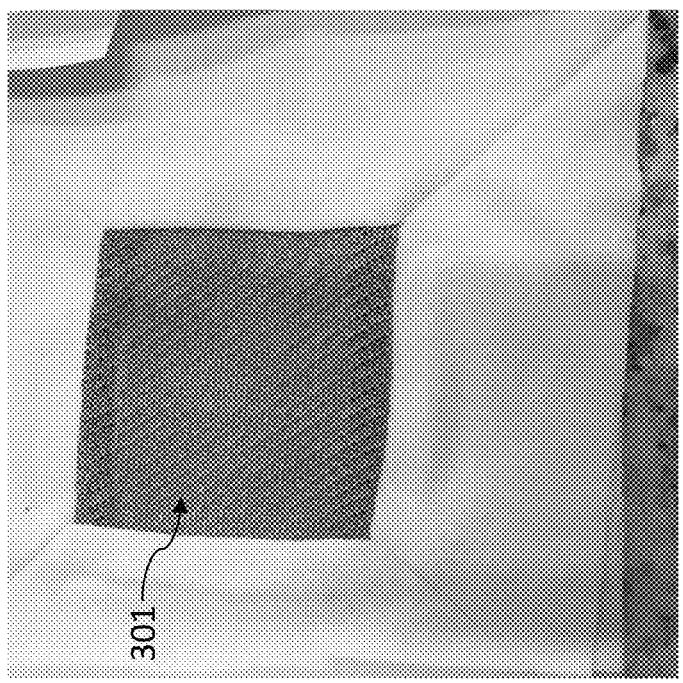
FIG. 4 is a close-up of one of the cloths with a square of spider silk shown in FIG. 3 in accordance with some embodiments of the invention.

FIG. 3 is a photograph that includes samples of spider silk materials, namely a cloth with square of spider silk fibers 301 (dyed green) and a cloth with spider silk fibers 302 (white). A close-up view of the square of spider silk fibers 101 is shown in FIG. 4. These materials can be prepared using the processes described above and shown in FIG. 2B.

Some embodiments provide load-bearing composite panels, materials, and products made from long and/or short fiber reinforced polyurethane surrounding an assembly made from one or more load-bearing members and a structural polyurethane sandwich composite. Some embodiments of the provide a process involving surrounding a short or long or continuous spider silk fiber and/or spider silk cloth and/or spider silk proteins reinforced polyurethane and/or resin and assembly made from one or more load-bearing members and a structural polyurethane sandwich composite. In some embodiments, the surrounding can additionally incorporate a long fiber. In some embodiments, as load-bearing members can be natural (e.g., wood), synthetic (e.g., polyurethane and other polymers) and metal (e.g., steel and aluminum) tubes, rods, beams, slabs, plates, planks and stampings and/or a combination of all the aforementioned materials. The load-bearing members can be hollow or solid in some embodiments. In some embodiments, the structural polyurethane or resin sandwich composite can encase or abut (contact) these load-bearing member(s) as the panels/materials/products' intended use may necessitate. In some embodiments, the structural polyurethane or resin sandwich composites can be made from one or more spider silk mats, glass fiber mats, a rigid or flexible polyurethane foam, aluminum honeycomb, Nomex® honeycomb, steel honeycomb, carbon fiber honeycomb, Kevlar® honeycomb and a paper honeycomb.

Some embodiments include long and/or short fiber (which can include long and/or short spider silk fibers and/or spider silk proteins)-reinforced polyurethane contains reinforcing fibers whose nature is such as to prevent the use of a conventional high pressure mixing head. In some embodiments, the long fibers can be introduced into the polyurethane by means, for example, of chopped fiber injection ("CFI") techniques, known to those skilled in the art. CFI machines and processes are available from a number of suppliers including Krauss-Maffei (LFI-PUR), The Cannon Group (InterWet) and Hennecke GmbH (FipurTec). In some embodiments, the long fibers useful in some embodiments of the invention can be more than about 3 mm, or more than about 10 mm, and/or from about 12 mm to 75 mm in length. In some embodiments, the long fibers can make up from 5 to 75 wt. %, or from 10 to 60 wt. %, or from 20 to 50 wt. % of the long fiber-reinforced polyurethane. The long fibers can be present in the long fiber-reinforced polyurethane of the inventive load-bearing composite panel in an amount ranging between any combinations of these values, inclusive of the recited values.

In some embodiments, the long fibers can be incorporated in the form of mats or cloth into the polyurethane. Examples of suitable types of long fibers, mats or cloth for use in some embodiments of the invention include, but are not limited to, glass fibers; spider silk fibers; natural fibers, such as those of flax, jute or sisal; and synthetic fibers, such as polyamide fibers, Kevlar® fibers, polyester fibers, carbon fibers and polyurethane fibers. Glass and spider silk fibers are particularly preferred as long fibers in some embodiments of the invention.

In some embodiments of the invention, spider silk protein can be added and/or mixed with the polyurethane and/or resin mixture-liquid in different percentages (e.g., between 0.01% and 99.99%) to increase the mechanical properties of the inventive load-bearing composite panel. In some embodiments of the invention, the polyurethanes are the reaction products of polyisocyanates with isocyanate-reactive compounds, and optionally reacted in the presence of blowing agents, catalysts, auxiliaries and additives. In some embodiments, suitable isocyanates, polyether polyols, blowing agents, catalysts, auxiliaries, and additives are identified in Cageao. For example, in some embodiments, suitable isocyanates include unmodified isocyanates, modified polyisocyanates, and isocyanate prepolymers. In some further embodiments, the organic polyisocyanates include aliphatic, cycloaliphatic, araliphatic, aromatic, and heterocyclic polyisocyanates of the type described, for example, by W. Siefken in Justus Liebigs Annalen der Chemie, 562, pages 75 to 136. Some example embodiments include isocyanates represented by the formula Q(NCO)n, where n is a number from 2-5, preferably 2-3, and Q is an aliphatic hydrocarbon group containing 2-18, preferably 6-10, carbon atoms; a cycloaliphatic hydrocarbon group containing 4-15, preferably 5-10, carbon atoms; an araliphatic hydrocarbon group containing 8-15, preferably 8-13, carbon atoms; or an aromatic hydrocarbon group containing 6-15, preferably 6-13, carbon atoms. In some embodiments, examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane (isophorone diisocyanate; e.g., German Auslegeschrift 1,202,785 and those disclosed in U.S. Pat. No. 3,401,190); 2,4- and 2,6-hexahydrotoluene diisocyanate and mixtures of these isomers; dicyclohexylmethane-4,4'-diisocyanate (hydrogenated MDI, or HIVIDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4"-triisocyanate; polyphenyl-polymethylene-polyisocyanates of the type which can be obtained by condensing aniline with formaldehyde, followed by phosgenation (crude MDI), which are described, for example, in GB 878,430 and GB 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. No. 3,394,164 and 3,644,457; modified polyisocyanates containing allophanate groups of the type described, for example, in GB 994,890, BE 761,616, and NL 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in GB 889,050; polyisocyanates obtained by telomerization reactions of the type described, for example, in U.S. Pat. No. 3,654,106; polyisocyanates containing ester groups of the type described, for example, in GB 965,474 and GB 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. In some embodiments, it is also possible to use the isocyanate-containing distillation residues accumulating in the production of isocyanates on a commercial scale, optionally in solution in one or more of the polyisocyanates mentioned above. Moreover, mixtures of any two or more polyisocyanates described above can also be used in some embodiments.

Some embodiments include isocyanate-terminated prepolymers for the preparation of the polyurethanes. In some embodiments, prepolymers can be prepared by reacting an excess of organic polyisocyanate or mixtures thereof with a minor amount of an active hydrogen-containing compound as determined by the well-known Zerewitinoff test, as described by Kohler in Journal of the American Chemical Society, 49, 3181(1927). In some embodiments, although any isocyanate-reactive compound can be used to produce the polyurethanes of the inventive composite, polyether polyols are preferred as isocyanate-reactive components. Suitable methods for preparing polyether polyols are known and are described, for example, in EP-A 283 148, U.S. Pat. Nos. 3,278,457; 3,427,256; 3,829,505; 4,472,560; 3,278,458; 3,427,334; 3,941,849; 4,721,818; 3,278,459; 3,427,335; and 4,355,188.

In some embodiments, polyether polyols can be used, including those resulting from the polymerization of a polyhydric alcohol and an alkylene oxide. Some example embodiments include ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, or 1,2,6-hexanetriol. Any suitable alkylene oxide can be used such as ethylene oxide, propylene oxide, butylene oxide, amylene oxide, and mixtures of these oxides. In some embodiments, the polyoxyalkylene polyether polyols can be prepared from other starting materials such as tetrahydrofuran and alkylene oxide-tetrahydrofuran mixtures, epihalohydrins such as epichlorohydrin, as well as aralkylene oxides such as styrene oxide. In some embodiments, the polyoxyalkylene polyether polyols can have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols and copolymer glycols prepared from blends or sequential addition of two or more alkylene oxides. The polyoxyalkylene polyether polyols can be prepared by any known process.

In some embodiments of the invention, blowing agents to produce foamed products (or foamed portions of the product). In some embodiments, water can be used as a chemical blowing agent. In some embodiments, physical blowing agents include inert (cyclo) aliphatic hydrocarbons having from 4 to 8 carbon atoms which evaporate under the conditions of polyurethane formation.

Figure 5A:
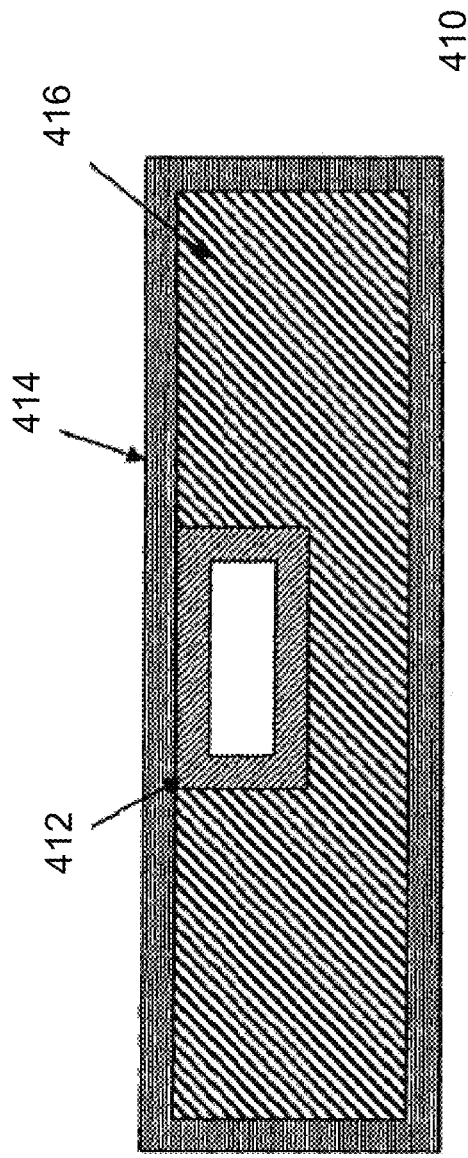
FIGS. 5A-5D show conventional load-bearing composite panels described in United States Patent Appl. Publ. No. 2007/0160793.
Figure 5B:
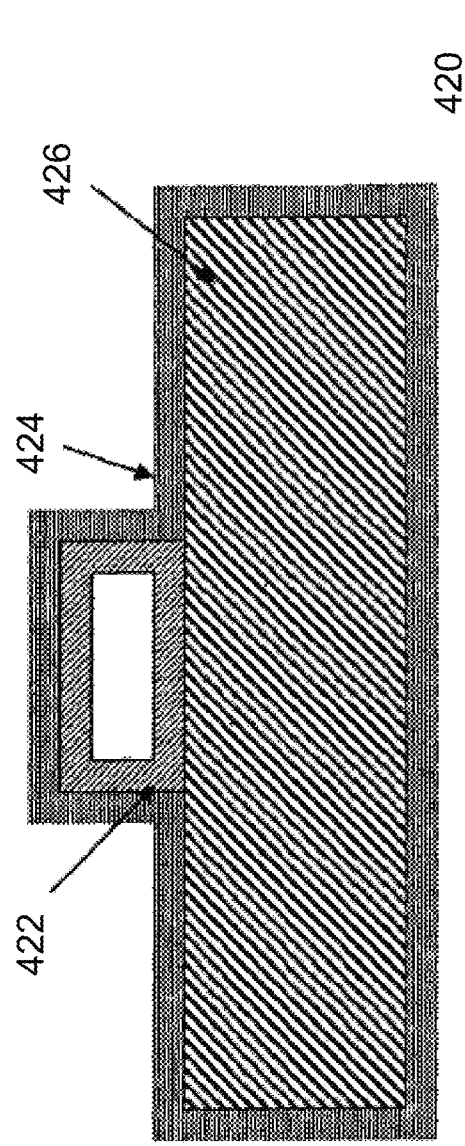
Figure 5C:
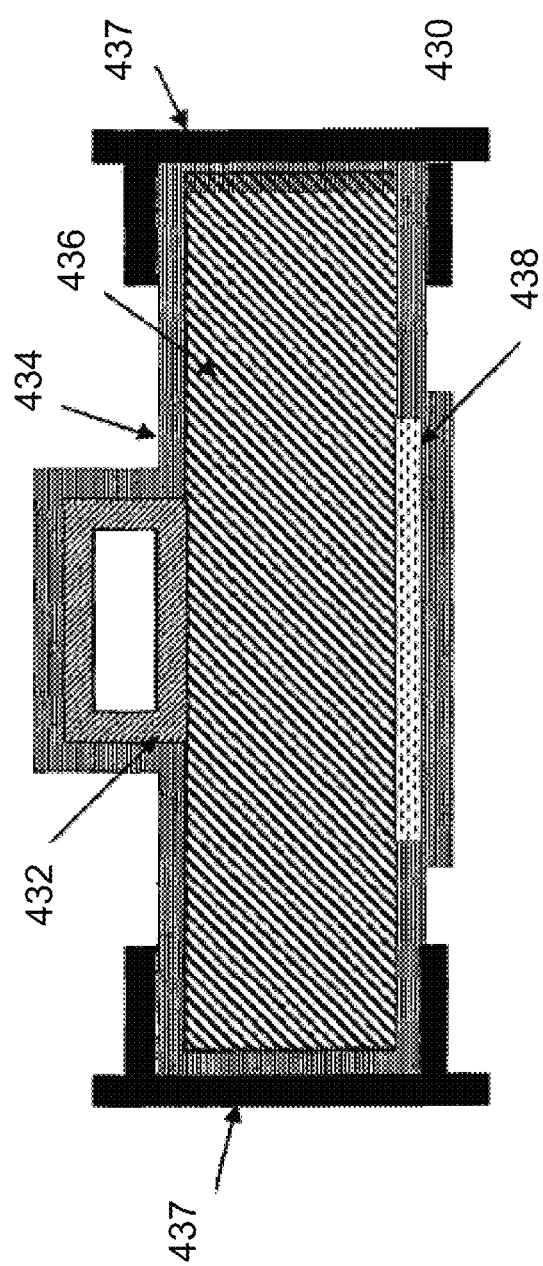
Figure 5D:
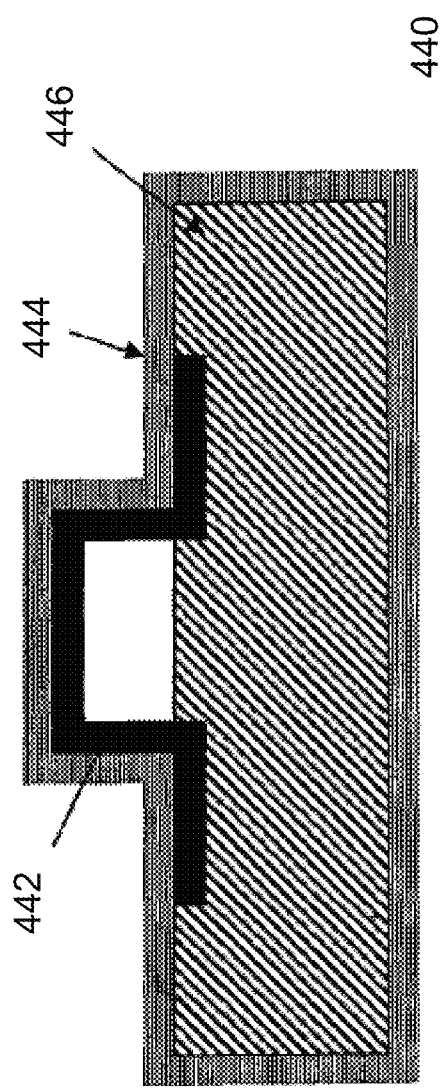

In some embodiments of the invention, one or more catalysts can be used for the polyurethane formation, and can be used to accelerate the reaction of the isocyanate with the isocyanate-reactive component. In some embodiments of the invention, the suitable catalysts include tertiary amines and/or organometallic compounds. Examples of compounds useful in one or more embodiments of the invention can include, but not be limited to, triethylenediamine, aminoalkyl- and/or aminophenyl-imidazoles, e.g. 4-chloro-2,5-dimethyl-1-(N-methylaminoethyl)imidazole, 2-aminopropyl-4,5-dimethoxy-1-methylimidazole, 1-aminopropyl-2,4,5- tributyl-imidazole, 1-aminoethyl-4-hexylimidazole, 1-aminobutyl-2,5-dimethylimidazole, 1-(3-aminopropyl)-2-ethyl-4-methylimidazole, 1-(3-aminopropyl)imidazole and/or 1-(3-aminopropyl)-2-methylimidazole, tin(II) salts of organic carboxylic acids, examples being tin(II) diacetate, tin(II) dioctoate, tin(II) diethylhexoate, and tin(II) dilaurate, and dialkyltin(IV) salts of organic carboxylic acids, examples being dibutyltin diacetate, dibutyltin dilaurate, dibutyltin maleate and dioctyltin diacetate. In some embodiments, the polyurethane forming reaction can take place, if desired, in the presence of auxiliaries and/or additives, such as cell regulators, release agents, pigments, surface-active compounds and/or stabilizers to counter oxidative, thermal or microbial degradation or aging In some embodiments of the invention, the load-bearing composite panels of some embodiments of the invention described herein can be produced by reaction injection molding (RIM) techniques, which are known to those skilled in the art. The mixture of the long fiber reinforced polyurethane and/or resin producing components with the fibers, including the spider silk fibers and/or proteins, can be accomplished according to the long fiber injection (LFI) process. In this instance, polyurethane can be used with a mixture of spider silk protein. Referring to FIGS. 5A-5D, illustrating conventional load-bearing composite panels described in United States Patent Appl. Publ. No. 2007/0160793, as described, FIG. 5A shows a cross section taken through a load-bearing composite panel 410. The load-bearing composite panel 410 has hollow load-bearing member 412 surrounded by a polyurethane sandwich composite 16. The entire assemblage is encased in long fiber reinforced polyurethane 414 to form the load-bearing composite panel 410. Further, FIG. 5B depicts a cross section taken through load-bearing composite panel 420 having a hollow load-bearing member 422 abutting (contacting) a structural polyurethane sandwich composite 426. In some embodiments, the entire assemblage is enclosed in long and/or short spider silk fiber and/or spider silk proteins reinforced polyurethane (or resins) 424 to form the load-bearing composite panel 420. Further, FIG. 5C illustrates a cross-section taken through an embodiment of the load-bearing composite panel 430 mounted in brackets. The load-bearing composite panel 430 includes a hollow load-bearing member 432 abutting (contacting) a structural polyurethane sandwich composite 436. A second, solid load-bearing member 438, in this case made of a different material than load-bearing member 432, also abuts (contacts) the structural polyurethane sandwich composite 436. In some embodiments, the entire assemblage is surrounded by long and/or short spider silk fiber and/or spider silk proteins fiber reinforced polyurethane (and/or resins) 434 to form the load-bearing composite panel 430 which is shown seated in brackets 437. Further, FIG. 5D provides a cross section taken through load-bearing composite panel 440 having a load-bearing member 442 made from a metal stamping abutting a structural polyurethane sandwich composite 446. The entire assemblage is encapsulated in long or short spider silk fiber and/or spider silk proteins reinforced polyurethane (and/or resins) 444 to form the load-bearing composite panel 440. In some embodiments of the invention, the entire assemblage shown in FIGS. 5A-5D can be encased in spider silk material (such as spider silk long fiber, spider silk protein, spider silk mat, or spider silk cloth) reinforced polyurethane to form the load-bearing composite panel. In some embodiments, the spider silk material is enclosed with long fiber.

In some embodiments, conventional injection molding processes can be used to produce composite materials and structures including spider silk fibers and/or spider silk proteins. For example, in some embodiments, spider silk fibers and/or spider silk proteins can be used within thermopolymer pellets for injection molding applications to improve the mechanical properties of any polymer that can be produced via injection molding. In other embodiments, spider silk fibers and/or spider silk proteins can be separately added into an injection mold machine (e.g., such as by adding into a hopper that feeds into a screw-scroll of an injection molding machine) along with thermopolymer pellets. As with other processing methods described herein, in some embodiments, the spider silk fibers can include long fibers, short fibers, or combinations thereof.

The composite panels of some embodiments of the invention encompass a variety of arrangements, configurations and combinations of load-bearing members within the structural polyurethane sandwich composite. For example, the structural polyurethane sandwich composite can encase a first load-bearing member and abut (contact) a second load-bearing member, or the structural polyurethane sandwich composite can enclose several load-bearing members and abut (contact) one or no second load-bearing member. The specific configuration and arrangement will be determined by the particular application for which the panel is intended.

The load-bearing composite panels of some embodiments of the invention can be incorporated into such items as automobile floor panels, vehicle body panels, bullet-proof anti-ballistic panels-products, vehicle bullet-proof anti-ballistic body panels, structures and floors, tires, wheels, bullet-proof vests, vehicle chassis structures, monocoque chassis, motor home chassis bodies, fuselages, floors and frames for aircraft and/or UAV's, bicycle and motorcycle frames, wind turbine blade frame structures, ship and boat haul body structures, submarines body structures, shipment containers, pre-fabricated walls and associated structures of homes and other buildings, train structures and body panels and/or floor panels, solar panel supports, battery housings, walls for mobile homes, roof modules, truck beds, truck trailer floors and the like. Such composite panels, materials, and products made with, or out of, spider silk fibers and/or spider silk proteins can also be utilized in artificial organs, ligaments or tendons, artificial disc vertebrae, ropes, and 3D printed parts.

As described earlier, by utilizing spider silk protein and fibers in various processes, the mechanical properties and/or performances can be improved (such as by mixing the spider silk proteins with the chemicals and/or using spider silk fibers to improve the mechanical properties of the components manufactured). Some embodiments of useful processes are detailed below. For example, some embodiments include utilizing spider silk protein and fibers in processes to make load-bearing composite panels, such as shown in the examples from Cageao (in paragraphs [0038]-[0061] and detailed further below.

In some embodiments, materials useful for preparing the composites can include, but not be limited to, Polyol A a sucrose-based polyether polyol having an OH number of 365-395; Polyol B an amine-initiated propylene oxide-extended hydroxyl-terminated triol having a weight average molecular weight of 240; Polyol C an ethylene diamine-based polyether polyol having an OH number of 600-660; Polyol D a polypropylene oxide-based triol having a weight average molecular weight of 160; Polyol E a polyester polyol containing oleic acid, adipic acid and pentaerythritol having an OH number of 51; Catalyst a 62/38 weight percent blend of glycol and potassium acetate, respectively; Release agent, the reaction product of adipic acid, pentaerythritol, and oleic acid, having an acid number of less than 15 and a hydroxyl number of less than 15; Pigment black pigment available as DR-2205 from Plasticolors, Inc.; Isocyanate A a polymeric diphenylmethane diisocyanate having an NCO group content of about 31.5%, a functionality of about 2.8, and a viscosity of about 196 mPa·s at 25° C.; and Isocyanate B an isocyanate-terminated prepolymer made by combining 90 parts Isocyanate A with 10 parts Polyol E, and having an NCO group content of about 28.5%.

In some embodiments, a structural polyurethane sandwich composite can comprise a polyurethane A produced by reacting isocyanate B at a ratio of isocyanate to polyol of 0.1.39:1.00 with polyol A 53.75 parts, polyol B 35.75 parts, fatty acid 5.0 parts, catalyst 0.5 parts, and pigment 5.0 parts. In some embodiments, structural polyurethane sandwich composite plaques can be produced by wrapping a piece of paper honeycomb in glass and/or spider silk fiber mat. The thickness of the honeycomb used can be determined by the thickness of the part required. The amount or weight of glass and/or spider silk fiber mat used can vary as well depending upon the strength characteristics desired. In most cases, the glass weight can vary from 225 g/m$^2$ to 1200 g/m$^2$. In some embodiments, Polyurethane A can be applied to both sides of the composite in amounts equal to the weight of glass on either side of the packet. Upon completion of spraying, the packet can be placed in a heated mold (200° F.-230° F.) where it can be compressed into its final shape.

In some further embodiments, a polyurethane B can comprise an Isocyanate A reacted at a ratio of isocyanate to polyol of 1.72:1.00 with the following polyol blend: Polyol B 40 parts, Polyol C 31 parts, Polyol D 17 parts, Quaternary amine salt 4 parts, release agent 6 parts, pigment 2 parts. Other embodiments can include a composite comprising steel tubing, structural polyurethane sandwich composite plaques and Polyurethane B. In some embodiments, to produce a composite panel, the following five pieces were arranged in the mold: 1) Structural polyurethane sandwich composite (5 in.×24 in.×1 in.), 2) Steel tubing (2 in.×24 in.×1 in.); 3) Structural polyurethane sandwich composite (10 in.×24 in.×1 in.); 4) Steel tubing (2 in.×24 in.×1 in.); and 5) Structural polyurethane sandwich composite (5 in.×24 in.×1 in.).

In some embodiments, a composite panel can be produced using long fiber technology (LFT), in which lengths of glass and/or spider silk fiber can be chopped and injected simultaneously with Polyurethane B into a heated mold at 150-175° F. After injection, the mold can be closed and the part cured. The panel can be coated on one side with Polyurethane B, removed from the mold, trimmed, and reinserted in the mold so that the second side could be coated using the LFT process.

In some embodiments of the invention, polyurethane sandwich composite plaques can be produced utilizing such processes by wrapping pieces of aluminum, Kevlar®, Nomex® honeycomb with spider silk mat, long fiber and cloth. These can be produced by mixing spider silk protein with the polyurethane. In some embodiments, various lengths of spider silk fibers (with or without the glass fibers) can also be chopped and injected in the processes set forth in paragraphs of Cageao. For example, in some embodiments, a composite panel can be produced using long fiber technology (LFT), in which lengths of glass fiber can be chopped and injected simultaneously with Polyurethane B into a heated mold at 150-175° F. After injection, the mold can be closed and the part cured. In some embodiments, the panel can be coated on one side with Polyurethane B, removed from the mold, trimmed, and reinserted in the mold so that the second side can be coated using the LFT process. A non-limiting example embodiment can be a floor of a car chassis or an entire vehicle chassis made by wrapping a honeycomb core with spider silk mat or knitted cloth, which is then sprayed with the polyurethane and chopped fibers. In some embodiments, the chopped long or short fibers can be from any source (fiberglass, Kevlar®, carbon fiber), and including spider silk fibers. In some embodiments, the "sandwich" can be placed in a pre-heated doubled-sided mold and pressed for around 1 to 2 minutes to make the floor of the chassis or the entire vehicle chassis structure (which is ready to be used). In some embodiments, spider silk proteins can be at least partially pre-mixed with the polyurethane.

Some embodiments include utilizing spider silk protein and fibers in processes to make fiber-reinforced polymer materials/products, such as the processes, materials, and products described in https://en.wikipedia.org/wiki/Fiber-reinforced_plastic. For example, spider silk fibers can be utilized to manufacture car body panels or airplane fuselages, such as indicated in below. Also, for example, a monocoque chassis can be manufactured using spider silk cloth (knitted in different weaves). For example, some embodiments can include two-dimensional and/or three-dimensional orientations. For example, some embodiments include a two dimensional fiber-reinforced polymer characterized by a laminated structure in which the fibers are only aligned along the plane in x-direction and y-direction of the material, and where no fibers are aligned through the thickness or the z-direction. Other embodiments can include a three-dimensional fiber-reinforced polymer composite with three dimensional fiber structures that incorporate fibers in the x-direction, y-direction and z-direction.

Some embodiments include the manufacture of fiber, including spider silk fiber, preforms. For example, in some embodiments, fiber, including spider silk fiber, preforms are manufactured before being bonded to the matrix. Some embodiments include fiber preforms manufactured in sheets, continuous mats, or as continuous filaments for spray applications. In some embodiments, the spider silk fiber preform can be fabricated through textile processing techniques of weaving, knitting, braiding, stitching, or a combination thereof. For example, in the case of a weaving process performed in a conventional manner to produce two-dimensional fibers as well in a multilayer weaving that can create three-dimensional fibers. In some further embodiments, braiding is performed over the top of mandrels that vary in cross-sectional shape or dimension along their length, and can produce fabric that contains fibers at 45 degrees angles to one another. In some embodiments, braiding three-dimensional fibers can be done using four step, two step or multilayer interlock braiding, and four step or row and column braiding utilizes a flat bed containing rows and columns of yarn carriers that form the shape of the desired preform. In some embodiments, additional carriers can be added to the outside of the array. In some embodiments, there are four separate sequences of row and column motion, which act to interlock the yarns and produce the braided preform. In some embodiments, the yarns can be mechanically forced into the structure between each step to consolidate the structure in a similar process to the use of a reed in weaving. Two step braiding includes a process consisting of two steps in which the braiding carriers move completely through the structure between the axial carriers, and can be capable of forming preforms of essentially any shape, including circular and hollow shapes. In some further embodiments, multi-layer interlocking braiding can be used that consists of a number of standard circular braiders being joined together to form a cylindrical braiding frame. This frame can include a number of parallel braiding tracks around the circumference of the cylinder but the mechanism allows the transfer of yarn carriers between adjacent tracks forming a multilayer braided fabric with yarns interlocking to adjacent layers. In some embodiments, knitting fiber, including spider silk fibers, preforms can be fabricated with conventional methods of warp and [weft] knitting, and/or stitching, and the fabric produced is a two-dimensional fabric, or multilayer fabrics with yarns that traverse between the layers.

Some embodiments of the invention include forming processes where a rigid structure is used to establish the shape of the spider silk fiber reinforced composite. In some embodiments, parts can be laid up on a flat surface referred to as a "caul plate" or on a cylindrical structure referred to as a "mandrel". However, most spider silk fiber and/or any other fiber-reinforced polymer parts can be created with a mold or "tool". In some embodiments, molds can be concave female molds, male molds, or the mold can completely enclose the part with a top and bottom mold. Some embodiments include molding processes of placing the spider silk fiber and/or any other fiber preform on or in the mold, where the preform can be dry spider silk fiber, or spider silk fiber that already contains a measured amount of resin called "pre-preg". "Pre-preg" is a term for "pre-impregnated" composite fibers where a matrix material, such as epoxy, is already present. In some embodiments, this epoxy resin or any other form of resin can also have spider silk proteins mixed in the resin matrix. The fibers often take the form of a weave and the matrix is used to bond them together and to other components during manufacture. The matrix is only partially cured to allow easy handling; this is called B-Stage material and requires cold storage to prevent complete curing. B-Stage pre-preg is always stored in cooled areas since heat accelerates complete polymerization. Hence, composite structures built of pre-pregs will mostly require an oven or autoclave to cure. Pre-preg process can include impregnation of a bulk amount of spider silk fiber and/or any other fiber that can then be stored in a cooled area (−20° C.) for an extended period of time to cure later. In some embodiments, dry fibers can be "wetted" with resin either by hand or the resin is injected into a closed mold. The part can then be cured (e.g., by heating, and/or by applying pressure), leaving the matrix and fibers in the shape created by the mold. Some embodiments include utilizing spider silk protein and fibers in processes to make pre-impregnated composite fibers ("pre-preg"), such as the processes (and materials/products) set forth in https://en.wikipedia.org/wiki/Pre-preg. For example, such processes can be used to manufacture car body panels, chassis, bike frames, prosthetics, boat hulls, and aerospace fuselages for drones, planes, and helicopters.

Some embodiments include the use of bladder molding, where individual sheets of spider silk fiber pre-preg material can be laid up and placed in a female-style mold along with a balloon-like bladder. The mold is closed and placed in a heated press. Finally, the bladder is pressurized forcing the layers of material against the mold walls. Some further embodiments include the use of compression molding, where the raw material (polymer block, rubber block, polymer sheet, or granules) contains reinforcing fibers, and a compression molded part qualifies as a fiber-reinforced polymer. In compression molding, a "preform" or "charge", of SMC, BMC is placed into a mold cavity. The mold is closed and the material is formed & cured inside by pressure and heat. Some embodiments, compression molding of geometric shapes ranging from pattern and relief detailing to complex curves and creative forms, to precision engineering all within a maximum curing time of 20 minutes. Some further embodiments include an autoclave and vacuum bag where individual sheets of pre-preg material are laid-up and placed in an open mold. The material is covered with release film, bleeder/breather material and a vacuum bag, and a vacuum is pulled on part and the entire mold is placed into an autoclave (heated pressure vessel). The part is cured with a continuous vacuum to extract entrapped gasses from laminate over a period of from one to several hours. Some other embodiments include mandrel wrapping, where sheets of spider silk fiber pre-preg material are wrapped around a steel or aluminum mandrel and compacted by nylon or polypropylene tape. In some embodiments. parts are typically batch cured by vacuum bagging and hanging in an oven, after which the tape and mandrel are removed leaving a hollow carbon and/or spider silk fiber tube. Some further embodiments include a wet layup process that combines spider silk fiber or any other fiber reinforcement and the matrix as they are placed on the forming tool. Reinforcing spider silk fibers or any other fiber layers are placed in an open mold, and then saturated with a wet resin and cured (at ambient or with heat). In some embodiments, a vacuum bag can be used to compress a wet layup. Glass fibers are most commonly used for this process, and the results are widely known as fiberglass. Fiberglass is used to make common products like skis, canoes, kayaks and surf boards. All the aforementioned materials can be produced using spider silk fibers yielding better mechanical properties.

In some embodiments of the invention, a chopper gun can be used where continuous strands of spider silk fibers and/or fiberglass are pushed through a hand-held gun that both chops the strands and combines them with a catalyzed resin such as polyester. The impregnated chopped spider silk fibers and/or glass is shot onto the mold surface. In some embodiments, filament winding is used where machines pull fiber bundles through a wet bath of resin and wound over a rotating steel mandrel in specific orientations, and parts are cured at room temperature or elevated temperatures. The mandrel is extracted, leaving a final geometric shape, or can be left in place. Some further embodiments include the use of pultrusion, where spider silk fiber bundles and slit fabrics are pulled through a wet bath of resin and formed into the rough part shape. Saturated material is extruded from a heated closed die curing while being continuously pulled through die. Some of the end products of pultrusion are structural shapes, i.e. I beam, angle, channel and flat sheet. These materials can be used to create all sorts of spider silk fibers and/or fiberglass structures such as ladders, platforms, handrail systems tank, pipe and pump supports. Some further embodiments include resin transfer molding or resin infusion where spider silk fibers fabrics are placed into a mold into which wet resin is then injected. Resin is typically pressurized and forced into a cavity which is under vacuum in resin transfer molding, and the resin is pulled into cavity under vacuum in vacuum-assisted resin transfer molding. This molding process can enable precise tolerances and detailed shaping.

Some embodiments include utilizing spider silk protein and fibers in processes to make pure spider silk fibers and/or carbon-fiber-reinforced polymer materials/products, such as the processes (and materials/products) set forth in https://en.wikipedia.org/wiki/Carbon-fiber-reinforced_polymer. For example, in some embodiments, carbon fiber can be replaced with spider silk-fibers, or the carbon fiber (or Kevlar®) can be combined with spider silk fibers, to make a hybrid thread. Various proportions of hybrid thread can be used to make products such as car chassis and also body panels for different transportation sectors (such as helicopter and airplanes fuselages-parts, race cars, and rockets' bodies-panels). In addition, in some embodiments, the spider silk proteins can be mixed with the matrix (resin or other chemicals) to make products, such as sporting goods (racquets, bats, etc.).

In some embodiments of the invention, the hybrid thread can comprise spider silk protein and/or fibers and carbon fiber reinforced polymer, carbon fiber reinforced polymer (e.g., such as a thermopolymer or a thermoset polymer). In some embodiments, the binding polymer can be a thermoset resin such as epoxy. In some further embodiments, other polymers can be polyester, vinyl ester or nylon. In some embodiments, the composite can contain other fibers such as one or more aramids (e.g. Kevlar, and/Twaron aramid fibers), aluminum, ultra-high-molecular-weight polyethylene (UHMWPE) and/or glass fibers, and/or carbon fiber In some embodiments, additives such as silica, rubber and/or carbon nanotubes, graphite and/or carbon particles and/or fibers can be added. In some embodiments, using any of the materials described above as an elementary fiber, a bidirectional woven sheet can be created, (e.g., a twill with a 2/2 weave).

In some embodiments, any of the hybrid thread parts or components described above can be created using a single layer of spider silk fiber and/or carbon fabric that is backed with fiberglass, and a conventional chopper gun can be used to quickly create these composite parts. In some embodiments, rolls of spider silk fibers and/or fiberglass can be cut into short lengths and spray out with resin at the same time to enable the spider silk fibers and/or fiberglass and resin to mix. The resin can be either an external mix, where the hardener and resin are sprayed separately, or internally mixed. In some other embodiments, any of the hybrid thread parts or components described above can be created using a molding process by layering sheets of spider silk fiber cloth and/or carbon fiber cloth into a mold in the shape of the final product. The alignment and weave of the cloth fibers can be chosen to optimize the strength and stiffness properties of the resulting material. The mold can then be filled with epoxy and heated or air-cured. In some embodiments, parts used in less critical areas can be manufactured by draping cloth over a mold, with epoxy either pre-impregnated into the fibers coated over the surface. In some embodiments, high-performance parts can be fabricated using single molds, and are often vacuum-bagged and/or autoclave-cured. An alternative to the autoclave method is to use internal pressure via inflatable air bladders or EPS foam inside the non-cured laid-up spider silk and/or carbon fiber.

In some further embodiments, vacuum bagging can be used, where a fiberglass, carbon fiber or aluminum mold is polished and waxed, and a release agent applied before the spider silk fiber fabric and resin are applied, and a vacuum is pulled, and is set aside to allow the piece to cure (harden). There are various ways to apply the resin to the spider silk fiber fabric in a vacuum mold. For example, some embodiments include a first method that is manual (called a wet layup) where the two-part resin is mixed and applied before being laid in the mold and placed in the bag. Other embodiments include methods using infusion, where the dry spider silk fiber fabric and mold are placed inside the bag while the vacuum pulls the resin through a small tube into the bag, then through a tube with holes or something similar to evenly spread the resin throughout the spider silk fiber fabric. Some embodiments use a wire loom for a tube that requires holes inside the bag. Both of these methods of applying resin require hand work to spread the resin evenly to obtain a glossy finish with very small pin-holes. Some further embodiments use a dry layup process, where spider silk fiber and/or carbon fiber material is already impregnated with resin (pre-preg) and is applied to the mold, and the assembly is then placed in a vacuum to cure. Some other embodiments can use compression molding, where a two-piece (male and female) mold is pressed together with the spider silk fiber fabric and resin between the two. Other embodiments use a filament winding for difficult or convoluted shapes, by winding filaments around a mandrel or a core.

Figure 7:
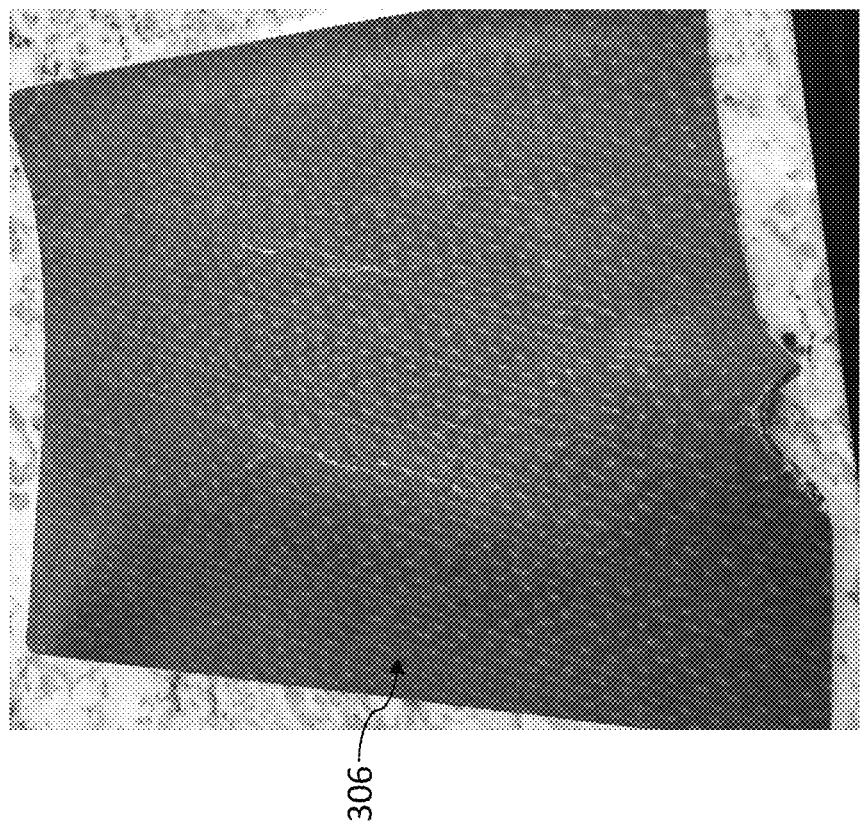
FIG. 7 is a close-up of another of the honeycomb materials shown in FIG. 3 in accordance with some embodiments of the invention.
Figure 6:
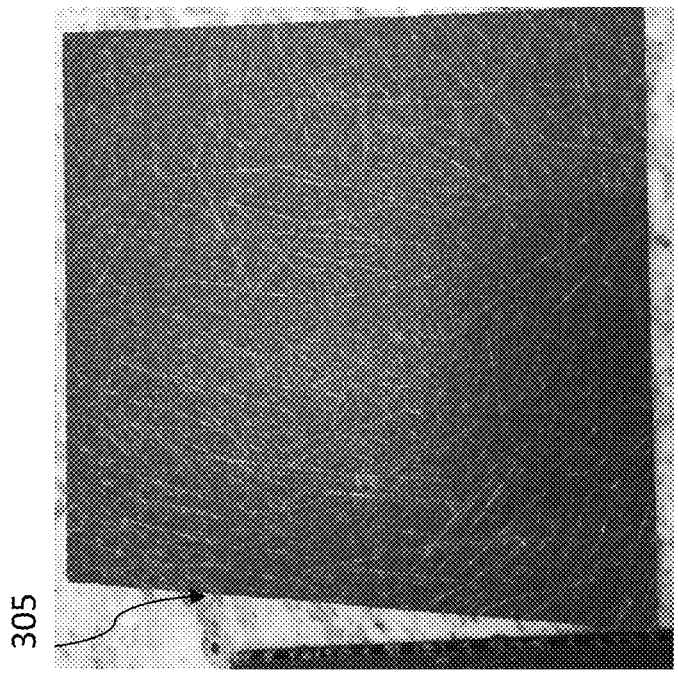
FIG. 6 is a close-up of one of the honeycomb materials shown in FIG. 3 in accordance with some embodiments of the invention.
Figure 8:
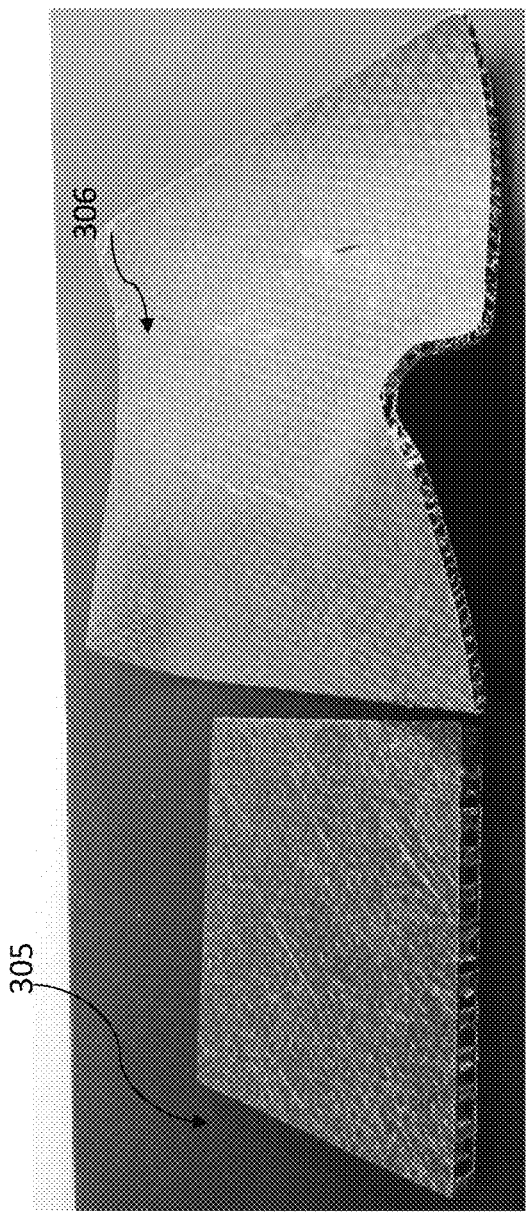
FIG. 8 is a side view of two of the honeycomb materials shown in FIG. 3 in accordance with some embodiments of the invention.
Figure 9:
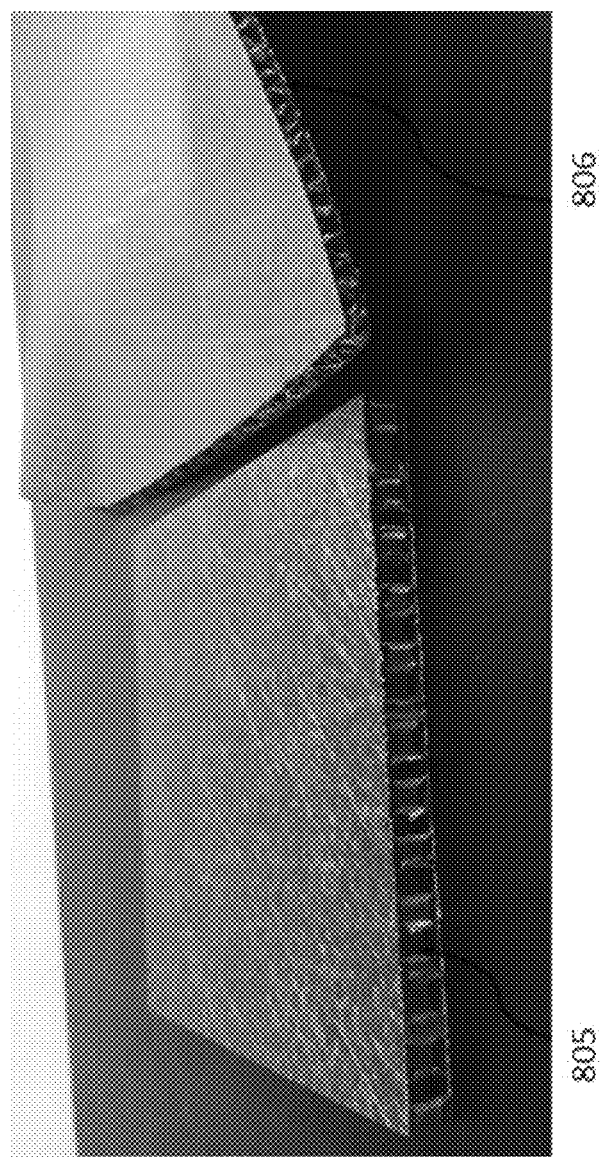
FIG. 9 is a close-up view of the side view of the two honeycomb materials shown in FIG. 8 in accordance with some embodiments of the invention.
Figure 10:
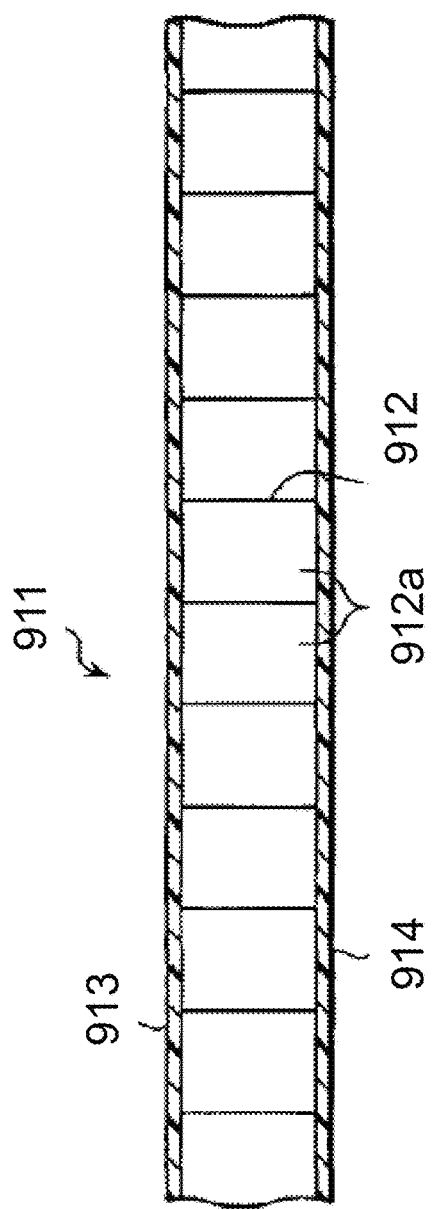
FIG. 10 is a longitudinal cross-sectional view of a honeycomb sandwich panel according to some embodiments of the invention.
Figure 11:
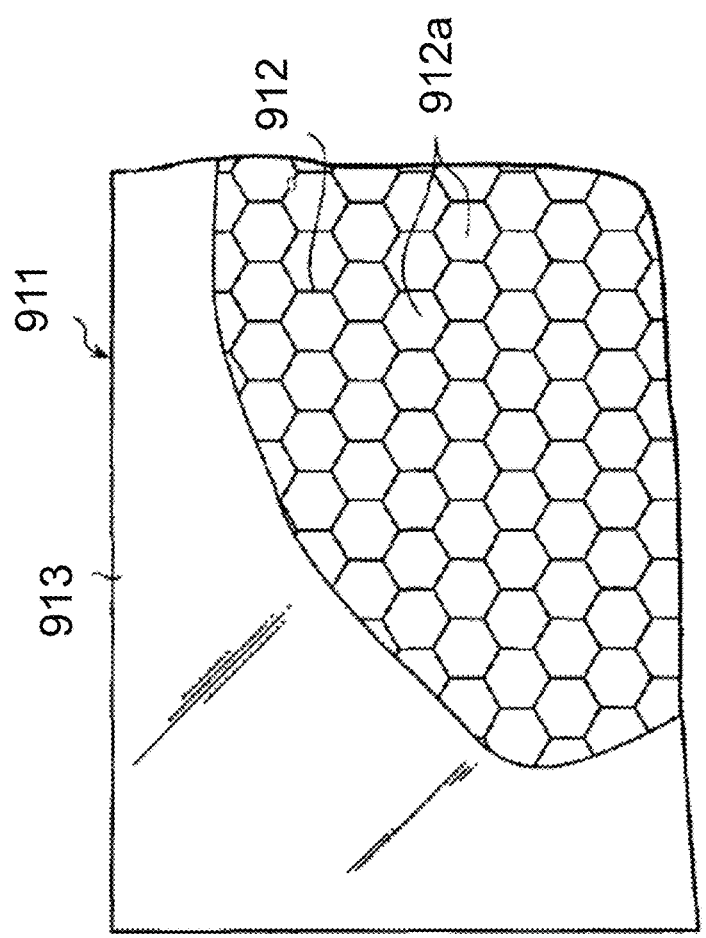
FIG. 11 is a plan view of the honeycomb sandwich panel of at least one embodiment of the invention in which a front surface layer is partially cut away in accordance with some embodiments of the invention.

Some embodiments include utilizing spider silk protein and fibers in processes to make fibers combined with a honeycomb structure, such as the processes (and materials/products) set forth in U.S. Pat. No. 6,743,497, issued to Ueda et al. For example, Honeycomb materials 303-306 that have spider silk materials incorporated therein are shown in FIG. 3 with close-ups of honeycomb materials 305-306 shown in FIGS. 6-7, respectively. Further, FIGS. 8-9 show side views of honeycomb materials 305-306 including close up of sides 805-806 of honeycomb materials 305-306, respectively. For example, such processes can be used to manufacture car chassis, airplane and helicopter fuselages, racecar monocoque chassis, prefab homes, containers, boats, etc. For example, FIG. 10 is a longitudinal cross-sectional view of a honey-comb sandwich panel according to an embodiment of the invention. Further, FIG. 11 is a plan view of the honeycomb sandwich panel of at least one embodiment of the invention in which a front surface layer is partially cutaway. As shown in FIGS. 10 and 11, in some embodiments, a honeycomb sandwich panel 911 utilizing spider silk protein and fibers, which can be used as an interior material, partition material or structural member of an artificial satellite or a space station, comprises a honeycomb core 912. In some embodiments of the invention, the honeycomb core 912 can include a plurality of cells 912a (e.g., arranged like a honeycomb), which extend in the thickness direction through the core. In some embodiments, the honeycomb sandwich panel 911 can also comprise sheets of a front surface layer 913 and a rear surface layer 914 sandwiching the honeycomb core 912 on both sides thereof. In some embodiments of the invention, the honeycomb core 912 can be integrally formed of a light metal such as aluminum, Nomex® or a carbon fiber reinforced polymer as one piece. In some embodiments, at least one of the front surface layer 913 and the rear surface layer 914 can be made of a fiber reinforced polymer such as a spider silk fiber and/or carbon fiber reinforced polymer, and/or an aramid fiber reinforced polymer or a GFRP. In any case, a phenolic resin can be used as a matrix. The front and rear surface layers 913 and 914 can be fused to the respective surfaces of the honeycomb core 912 so as to close the openings of the cells 912a in the fiber reinforced polymer using a phenolic resin as a matrix, the phenolic resin is reinforced with spider silk fibers and/or carbon fibers or the like. The phenolic resin becomes porous when it is hardened, with the result that a breathable phenolic fiber reinforced polymer can be obtained. In this embodiment, each of the front and rear surface layers 913 and 914 is a two-ply sheet; however, it can be made of a single sheet, or three or more sheets.

Some further embodiments include utilizing spider silk protein, cloth, mesh type materials and structures, mats and fibers in reaction injection molding ("RIM") processes and other forms of injection molding processes, such as the processes (and materials/products) set forth in https://en.wikipedia.org/wiki/Reaction_injection_molding. For example, such processes can be used to manufacture car bumpers, car body panels, spoilers. In some embodiments, two reacting parts of the polymer including spider silk protein and/or fibers are mixed together, and the mixture injected into the mold under high pressure using an impinging mixer, where the polymer expands and cures. In some embodiments, reinforcing agents are added to the mixture (reinforced reaction injection molding (RRIM). Some common reinforcing agents include glass fibers and/or mica. Other embodiments used structural reaction injection molding (SRIM) that use fiber meshes for the reinforcing agent. The fiber mesh is first arranged in the mold and the polymer mixture is can be injection molded over it. In some embodiments, the polymer is polyurethane. Other polymers can include polyureas, polyisocyanurates, polyesters, polyphenols, polyepoxides, and nylon 6. As an example embodiments, for a polyurethane, one component of the mixture is polyisocyanate and the other component is a blend of polyol, surfactant, catalyst, and blowing agent.

Some embodiments include utilizing spider silk protein and fibers in vacuum infusion process ("VIP", also "resin infusion"), such as the processes (and materials/products) set forth in http://www.composites.ugent.be/home_made-_composites/documentation/FiberGlast_Vacuum_i nfusion-_process.pdf. For example, such processes can be used to manufacture car chassis, body panels, airplane and helicopter fuselages, boats, etc. In some embodiments, utilizing spider silk protein and fibers, vacuum pressure can be used to drive resin into a laminate. For example, materials can be laid dry into the mold and the vacuum applied before resin is introduced. Once a complete vacuum is achieved, resin can be sucked into the laminate via carefully placed tubing. In a typical hand lay-up, reinforcements can be laid into a mold and manually wet out using brushes, rollers, or through other conventional methods. Some embodiments can use a vacuum bag to suck excess resin out of the laminate. In some embodiments, using vacuum infusion, a vacuum is drawn while the materials are still dry, and resin is infused using vacuum pressure.

Some embodiments include utilizing spider silk protein and fibers in solid freeform fabrication ("SFF") and three-dimensional ("3D") printing processes, such as the processes (and materials/products) set forth in https://en.wikipedia.org/wiki/3Dprinting. 3D printing also known as additive manufacturing is any of various processes used to make a three-dimensional object. In 3D printing, additive processes are used, in which successive layers of material are laid down under computer control. The objects can be of almost any shape or geometry, and are produced from a 3D model or other electronic data source. In some embodiments, 3D printing processes are a set of layer-by-layer processes for producing 3D objects directly from a digital model. 3D printing technology can be used for prototyping and for distributed manufacturing with applications in, for example, architecture, construction ("AEC"), industrial design, automotive, aerospace, military, engineering, civil engineering, dental and medical industries, biotech (human tissue replacement), fashion, footwear, jewelry, eyewear, education, geographic information systems, food, and many other fields. In general terms, additive manufacturing is a process that takes virtual blueprints from computer aided design ("CAD") or animation modeling software and slices them into digital cross-sections for the machine to successively use as a guideline for printing. Depending on the machine used, material or a binding material is deposited until material/binder layering is complete and the final 3D model has been printed. When printing, the 3D printing machine reads the design and lays down successive layers of liquid, powder, paper or sheet material to build the model from a series of cross-sections. These layers are joined or automatically fused to create the final shape. In 3D printing machines that use an extrusion deposition process (also known as Fused Filament Fabrication ("FFF")), a polymer filament (typically wound on a coil and unreeled to supply material) is used and is applied through an extrusion nozzle, which regulates the flow of the molten polymer bead by controlling the filament feed rate. The extrusion nozzle heats to melt the material (or otherwise renders the material flowable). The extrusion nozzle can be moved in both horizontal and vertical directions by a computer-controlled mechanism. Alternatively, the printer platform bed can be moved relative to the extrusion nozzle, or coordinated movements of both the nozzle and platform can be used to achieve the desired extrusion path in the x, y, and z directions. The model or part is produced by extruding small beads of thermopolymer material to form consecutive layers in the vertical (i.e., z) direction. The material hardens immediately after extrusion from the extrusion nozzle. Various polymers are used in such an extrusion deposition process, including, but not limited to, the following: acrylonitrile butadiene styrene (ABS), polycarbonate (PC), polylactic acid (PLA), high density polyethylene (HDPE), PC/ABS, and polyphenylsulfone (PPSU). Generally, the polymer is in the form of a filament, fabricated from virgin resins.

In some embodiments, the spider silk proteins and fibers (including spider silk base films and glues) can be used as the filaments. For example, in some embodiments, pure spider silk fibers and/or proteins can be 3D printed into parts using any of the aforementioned 3D printing processes. In some embodiments, the spider silk proteins and fibers can be incorporated into filaments generally known in the art for 3D printing. The amount of spider silk proteins utilized can varied. For instance, between 0.5% to 99.99% by weight spider silk proteins or 0.001% to 0.5% by weight spider silk proteins can be added to 3D filament material (such as acrylonitrile butadiene styrene (ABS), polycarbonate (PC), polylactic acid (PLA), polyamide (nylon), glass-filled polyamide, stereo lithography materials (epoxy resins), silver, gold, titanium, steel, stainless steel, wax, photopolymers, high density polyethylene (HDPE), PC/ABS, and polyphenylsulfone (PPSU)). Thus, the spider silk proteins and/or fibers can be added to existing 3D printing materials and then used to 3D print parts with better mechanical properties.

The panels, materials, and products described herein can have improved characteristics, such as maximum stress, maximum strain, and toughness. Generally, when one of these characteristics is increased, this leads to the reduction of one or more of the other. Such products, materials, and products yield an improvement without such a reduction (or generally a simultaneous improvement of these other characteristics). Moreover, the weight of the panels, materials, and products of some embodiments of the invention remains light in comparison to other panels, materials, and products (with same characteristics). Furthermore, there is a large cost savings associated with the manufacturing of such panels, materials, and products. The spider silk proteins and fibers have hydrophobic capabilities due to their 3D tight binding geometry. For instance, spider silk proteins and fibers can repel moisture, which can be utilized for anti-corrosive coatings, water sealing, etc. The spider silk proteins and fibers have non-antigenic capabilities. The human body does not recognize them as foreign entities, so the body will generally not elicit an anti-immune response. This can beneficial in creating coatings and/or structures such as artificial organs or body components such as bones, ligaments, and tendons.

Some of the panels/materials/products described herein can have bulletproof capabilities. In some embodiments, films can be created with spider silk proteins and/or fibers that can be placed on windows (such as bulletproof polycarbonate windows) and used as anti-ballistic protection. These bulletproof spider silk films and fibers (cloth) can be placed in vehicles (includes all types of transportation, including military) body panels, frames, undercarriages, roofs, etc. Some further embodiments include products comprised of a mixture of spider silk fibers and proteins with polyurethanes, polypropolynes, ABS (acrylonitrile butadiene styrene), Polylactic acid (PLA), resins, cosmetics, soaps, paints adhesives, glues, coatings, films, 3D printing materials, any plastic or any chemicals in general. In some embodiments, spider silk proteins can be mixed with cosmetics, soaps, adhesives, glues, cleaning agents, paints, coatings, films, chemicals to improve their overall mechanical proteins.

Figure 12:
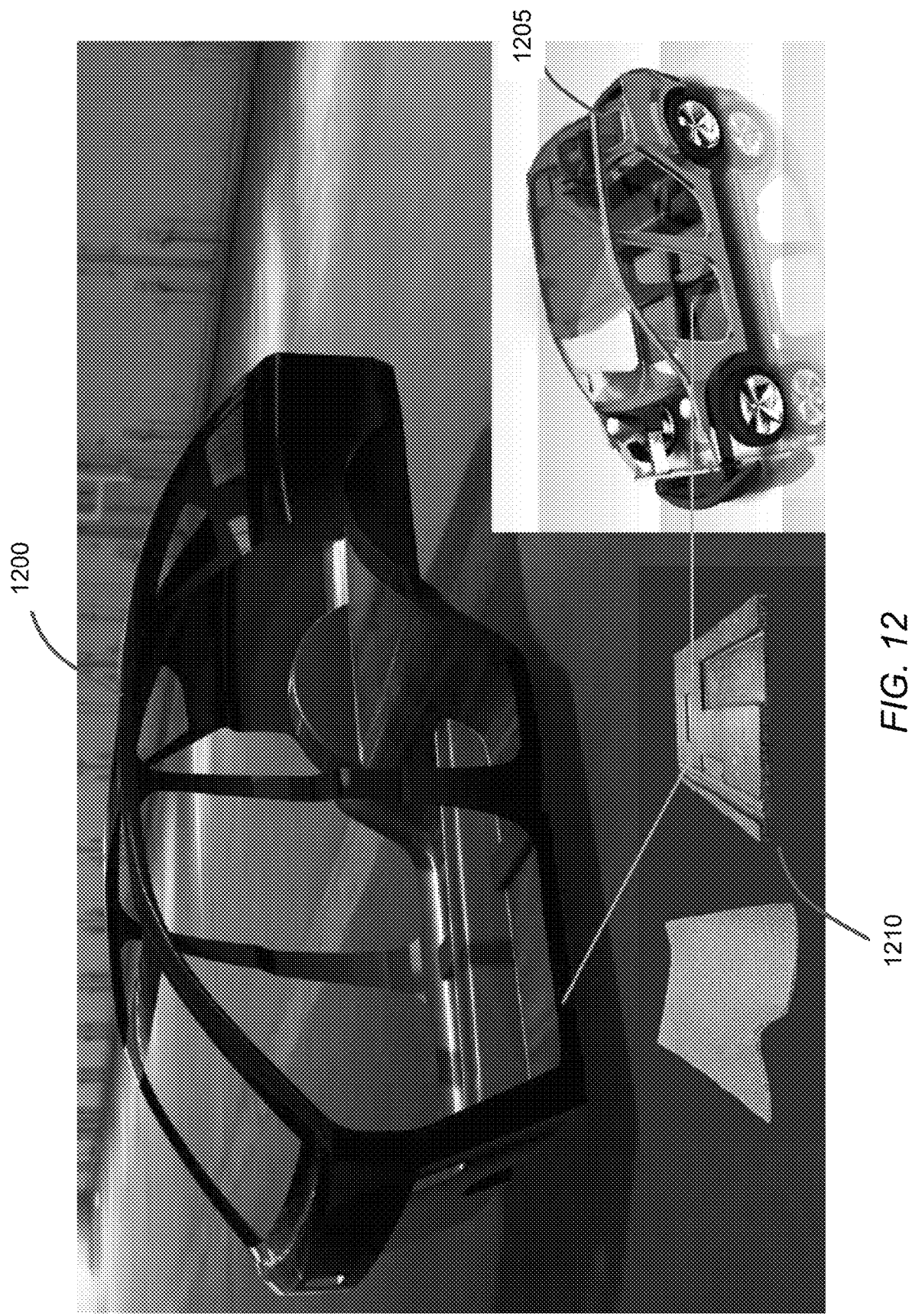
FIG. 12 illustrates a one piece honeycomb chassis including at least a portion with a silk-based composite in accordance with some embodiments of the invention.
Figure 13:
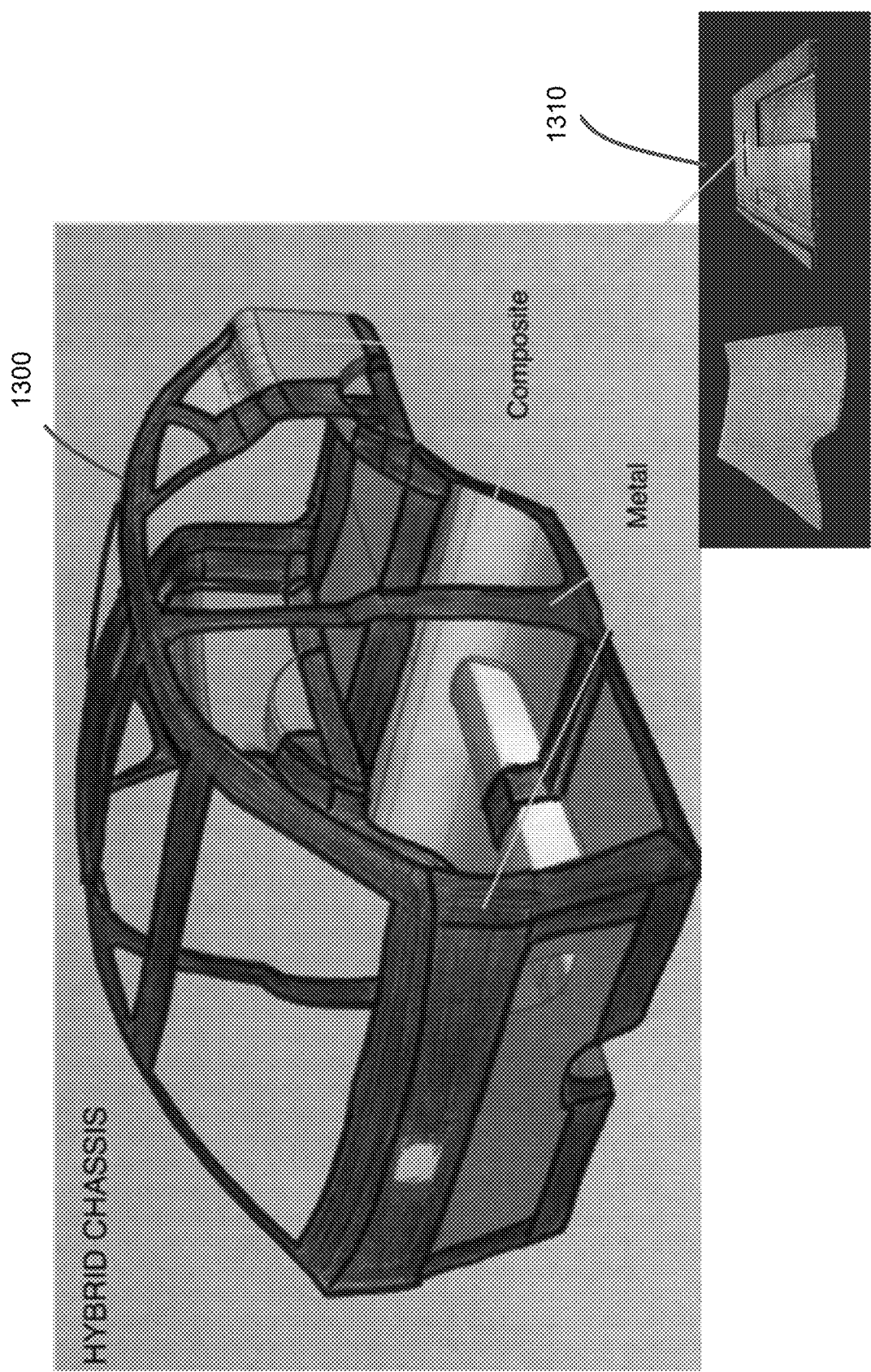
FIG. 13 illustrates a one piece hybrid honeycomb chassis including at least a portion with a silk-based composite in accordance with some embodiments of the invention.
Figure 14:
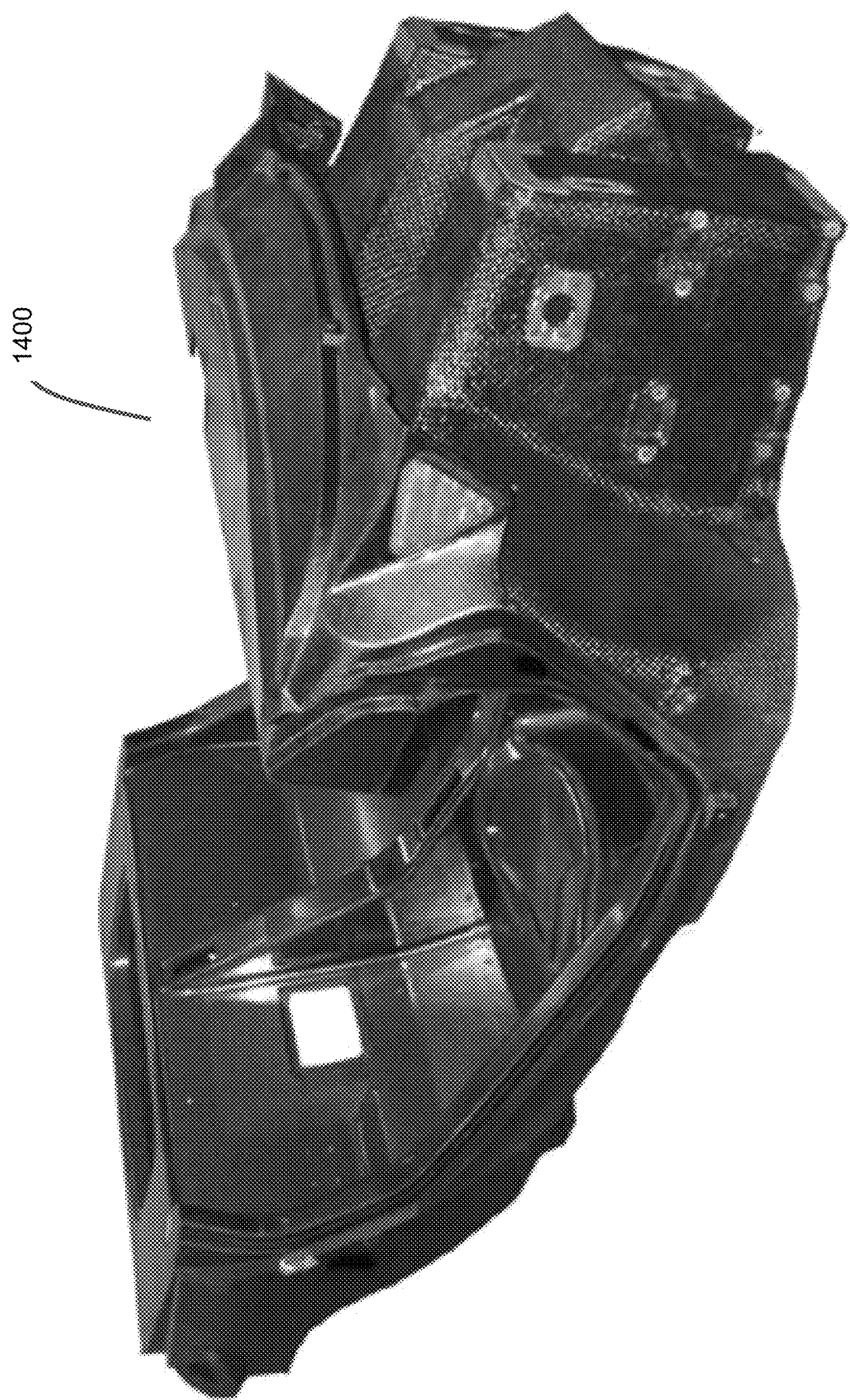
FIG. 14 illustrates a honeycomb chassis including at least a portion with a silk-based composite in accordance with some embodiments of the invention.

The spider silk proteins and/or fibers described herein can be used for anti-radar or stealth applications. The spider silk proteins and/or fibers can also be combined with carbon nanotubes (such as in the honeycomb materials discussed above). In some embodiments, the honeycomb materials can be pressed on a double sided mold and heated for curing. These honeycomb materials can be combined with the spider silk proteins and fibers. Accordingly, pure spider silk can be used as the fiber and spider silk proteins can be added to the polyurethane (in the processes discussed above). In some embodiments, a hybrid thread of different fibers (fiberglass, carbon fiber, Kevlar®, natural fibers) and spider silk fiber can also be utilized for this process. The panels/materials/products can be used for military applications, such as explosive devices, missiles, military vehicles (ships, boats, airplanes, submarines, rockets, tanks, cars, trucks, bikes, UAV's), etc. For example, any one or more of the materials and process including spider silk proteins, spider silk protein production, spider silk fibers and spider silk fibers or combinations thereof including any one or more of the materials or methods described above can be used to prepare one or more of the composites illustrated in FIGS. 12-17. The examples provided in FIGS. 12-17 herein are to more fully illustrate some of the embodiments of the invention. It should be appreciated by those of skill in the art that the techniques disclosed in the examples which follow represent techniques discovered to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention. For example, FIG. 12 illustrates a one piece honeycomb chassis 1200 of the inset with vehicle assembly 1205 including at least a portion with a silk-based composite in accordance with some embodiments of the invention. In some embodiments, the chassis 1200 can utilize one or more of the silk-based materials described earlier and can be processed using a double-sided mold stamp to produce a honeycomb composite 1210 that can form at least a portion of the chassis 1200. In some embodiments, the molds can be heated to 100° F. and pressed at 60 psi. Higher or lower temperatures and/or pressures can be used in other embodiments. Similarly, FIG. 13 illustrates a one piece hybrid honeycomb chassis 1300 including at least a portion with a silk-based composite in accordance with some embodiments of the invention. In some embodiments, any one or more of the silk-based materials and processes can be used to prepare a hybrid honeycomb chassis 1300 using at least one portion comprising a honeycomb composite 1310. Further, FIG. 14 illustrates a honeycomb chassis 1400 including at least a portion comprising a silk-based composite in accordance with some embodiments of the invention.

Figure 15:
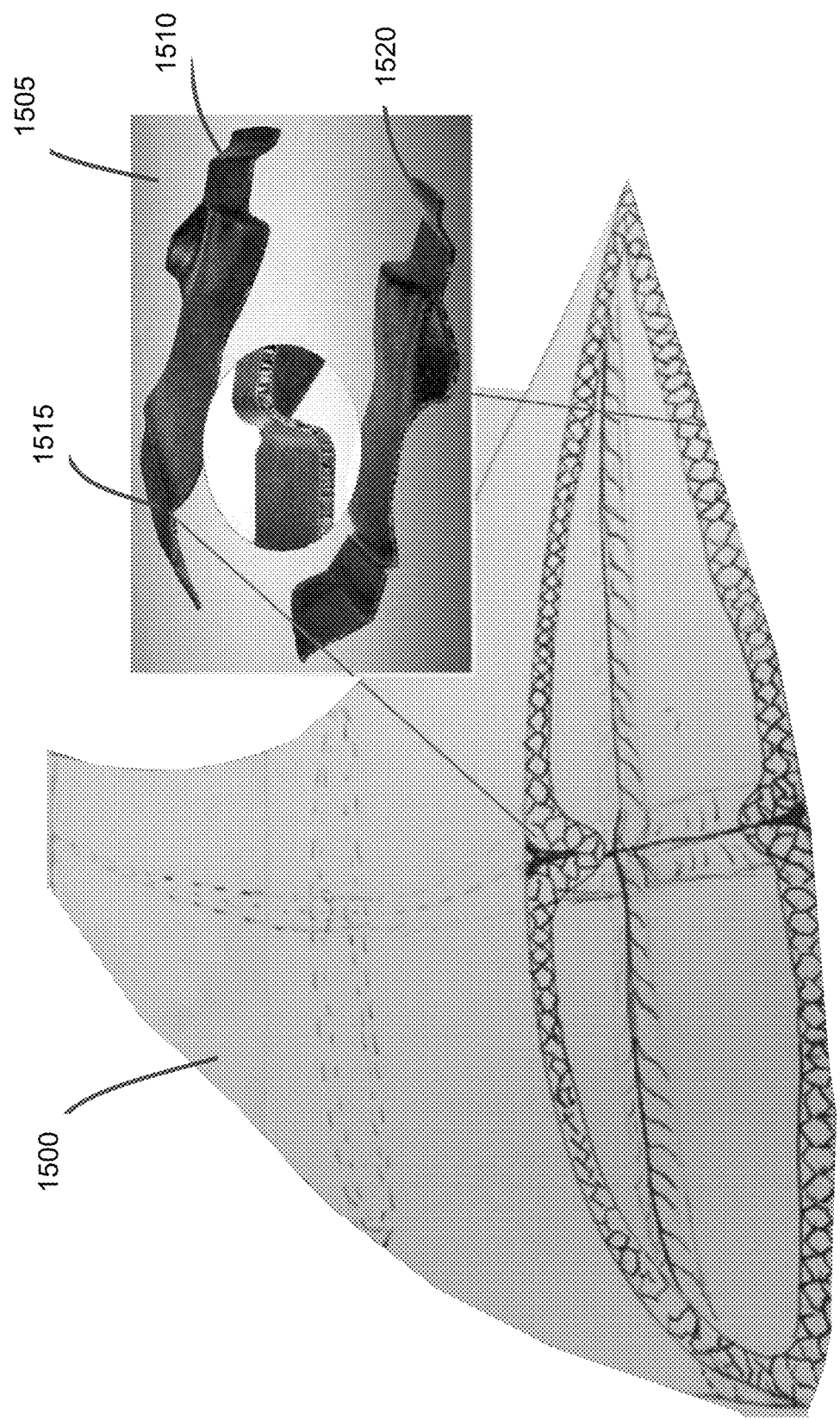
FIG. 15 illustrates a frame-less honeycomb portion of an aircraft or UAV fuselage including at least a portion with a silk-based composite in accordance with some embodiments of the invention.
Figure 16:
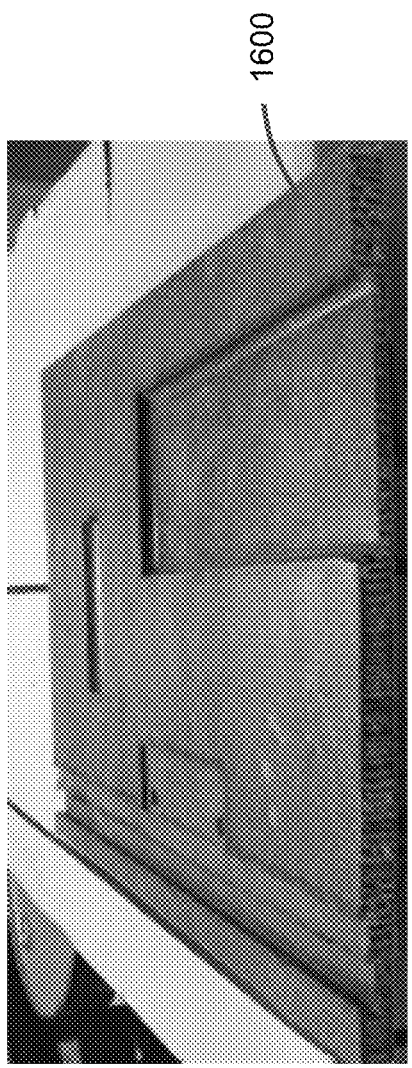
FIG. 16 illustrates honeycomb composite including at least a portion with a silk-based composite in accordance with some embodiments of the invention.
Figure 17:
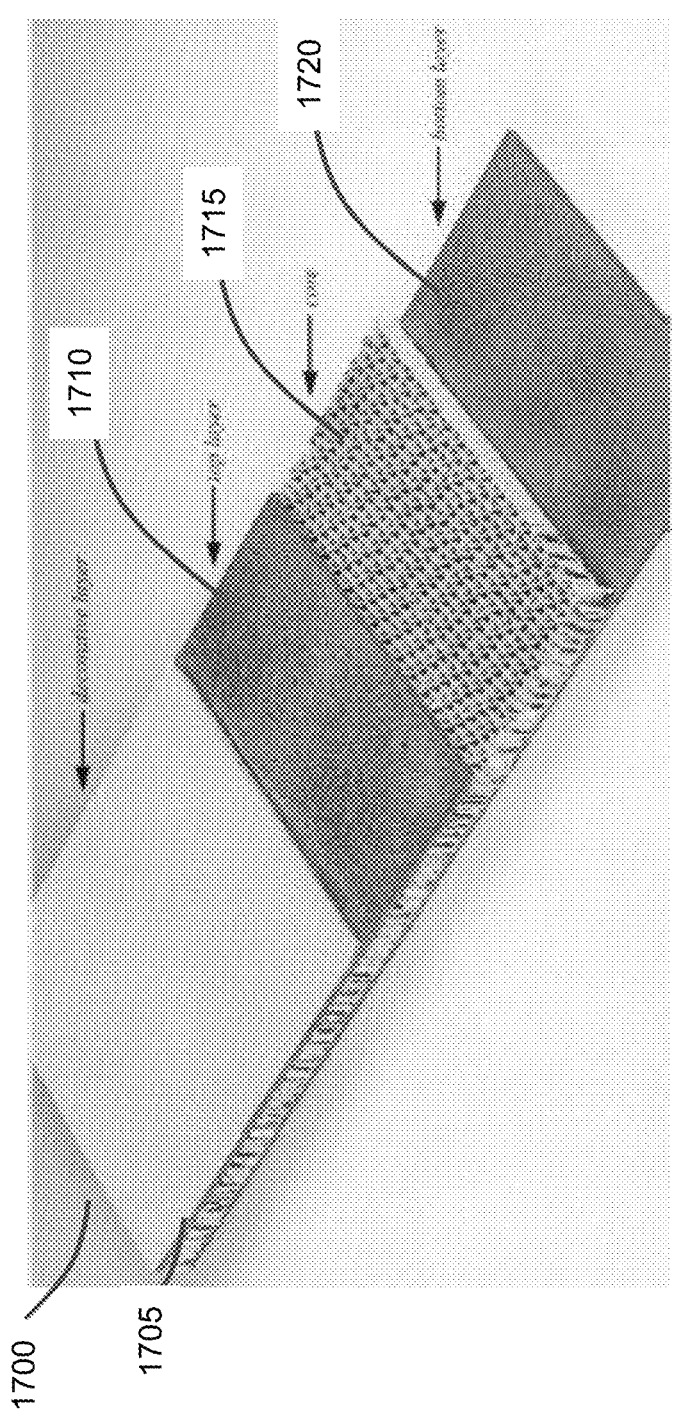
FIG. 17 illustrates a structure of the composite of FIG. 16 in accordance with some embodiments of the invention.

FIG. 15 illustrates a frame-less honeycomb portion 1500 of an aircraft or UAV's fuselage including at least a portion with a silk-based composite in accordance with some embodiments of the invention. In some embodiments, the honeycomb portion 1500 show as assembly inset 1505 can include a composite 1510 forming a reinforcing portion 1515, and composite 1520. Further, FIG. 16 illustrates honeycomb composite 1600 including at least a portion with a silk-based composite in accordance with some embodiments of the invention, and FIG. 17 illustrates a layup structure 1700 of the honeycomb composite 1600 FIG. 16 in accordance with some embodiments of the invention. In some embodiments, the structure 1700 can comprise layers including at least one decorative layer 1705, at least one top layer 1710, at least one core layer 1715, and at least one bottom layer 1720.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above.

The disclosures of all patents, patent applications, and publications cited herein are hereby incorporated herein by reference in their entirety, to the extent that they provide exemplary, procedural, or other details supplementary to those set forth herein.

The invention claimed is:

1. A silk fibroin composite comprising:
 a plurality of coupled layers wherein at least one of the layers includes a composite matrix of at least one non-silk polymer and silk fibroin material derived at least in part from expression of one or more spider silk genes within at least one living organism, the plurality of coupled layers further comprising:
 at least one backing or surface layer;
 a substantially honeycomb-shaped core including a plurality of cells,
  wherein the honeycomb-shaped core comprises the silk fibroin material, and
  the substantially honeycomb-shaped core coupled to the at least one backing or surface layer with a continuous fiber-reinforced polymer layer,
  wherein the continuous fiber-reinforced polymer layer closes openings of the plurality of cells, and
  wherein the continuous fiber-reinforced polymer layer comprises a phenolic resin matrix and continuous spider silk fiber and carbon fiber dispersed in the phenolic resin matrix; and
 wherein the at least one of the layers of the plurality of coupled layers includes a fibrous material.

2. The composite of claim 1, wherein the silk fibroin material includes at least one of silk fiber and silk polypeptides in a non-fibrous form.

3. The composite of claim 2, wherein the silk polypeptide in a non-fibrous form forms at least a portion of the composite matrix of the at least one backing or surface layer, or at least one layer of the plurality of coupled layers.

4. The composite of claim 1, wherein the at least one non-silk polymer includes at least one of a thermoplastic polymer and a thermoset polymer.

5. The composite of claim 1, wherein the plurality of coupled layers includes at least one of a polyurethane polymer, a polycarbonate polymer, a polypropylene polymer, an acrylonitrile butadiene styrene (ABS) polymer, a polylactic acid (PLA) polymer, a polyamide (nylon) polymer, a glass-filled polyamide polymer, an epoxy resin, silver, gold, titanium, steel, stainless steel, wax, a photopolymer, high density polyethylene (HDPE), polycarbonate-acrylonitrile butadiene styrene (PC/ABS) polymer, and polyphenylsulfone (PPSU) polymer.

6. The composite of claim 1, wherein the at least one non-silk polymer comprises polyurethane reaction product of one or more isocyanates and at least one isocyanate-reactive component.

7. The composite of claim 1, wherein the silk fibroin material includes at least one of a plurality of long fibers of varying lengths and a plurality of short fibers comprised of a variety of lengths; and
wherein the long fibers have lengths of more than 3 mm and the short fibers have lengths less than the shortest of any of the lengths of the plurality of long fibers.

8. The composite of claim 7, wherein the long fibers make up 0.5 wt.% to 99 wt. % of the combined weight of the plurality of coupled layers.

9. The composite of claim 1, wherein the silk fibroin material comprises electro-spun silk.

10. The composite of claim 1, wherein the silk fibroin material includes silk weave or cloth, silk fiber, silk mat.

11. The composite of claim 1, wherein at least a portion of the composite matrix is derived by injection molding, reaction-injection molding, chopped-fiber injection, extrusion, molding, film casting, web coating, spray-coating, weaving, vacuum injection, or 3D printing.

12. The composite of claim 1, wherein at least a portion of the plurality of coupled layers includes a fibrous material that includes at least one of a silk fiber, a silk weave or cloth, and a silk mat.

13. The composite of claim 12, wherein the article of manufacture includes at least one of a load-bearing structure, non-load-bearing structure, and a decorative or aesthetic structure.

14. The composite of claim 1, wherein the plurality of coupled layers is an article of manufacture selected from a land vehicle frame, an air vehicle frame, a sea vehicle frame, a land vehicle panel, an air vehicle panel, and a sea vehicle panel.

15. The composite of claim 1, wherein the at least one backing or surface layer further comprises a polyaramid fiber.

16. A silk fibroin composite comprising:
a plurality of coupled layers wherein at least one of the layers includes a composite matrix of at least one non-silk polymer and silk fibroin material derived at least in part from expression of one or more spider silk genes within at least one living organism, the plurality of coupled layers further comprising:
at least one backing or surface layer;
a substantially honeycomb-shaped core including a plurality of cells, wherein the honeycomb-shaped core comprises the silk fibroin material, and the substantially honeycomb-shaped core coupled to the at least one backing or surface layer with a continuous fiber-reinforced polymer layer, wherein the continuous fiber-reinforced polymer layer closes openings of the plurality of cells, and wherein the continuous fiber-reinforced polymer layer comprises a phenolic resin matrix and continuous spider silk fiber and carbon fiber dispersed in the phenolic resin matrix; and
wherein the at least one of the layers of the plurality of coupled layers includes a fibrous material.

17. The composite of claim 1, wherein the honeycomb core is comprised of a hybrid fiber of silk fiber and a polyaramid fiber.

18. A method of making a silk fibroin composite comprising:
providing at least one non-silk polymer and silk fibroin material derived at least in part from expression of one or more spider silk genes in at least one living organism;
combining at least a portion of the silk fibroin material and the at least one non-silk polymer material to form a mixture;
forming a composite matrix from at least a portion of the mixture using a process of injection molding, reaction-injection molding, chopped-fiber injection, extrusion, molding, film casting, web coating, spray-coating, weaving, vacuum injection, and 3D printing;
forming a plurality of coupled layers wherein at least one of the layers includes at least a portion of the composite matrix, the plurality of layers further comprising:
at least one backing or surface layer and at least one layer including a substantially honeycomb-shaped core including a plurality of cells, wherein the honeycomb-shaped core comprises the silk fibroin material and, the substantially honeycomb-shaped core coupled to the at least one backing or surface layer with a continuous fiber-reinforced polymer layer, wherein the continuous fiber-reinforced polymer layer closes openings of the plurality of cells, and wherein the continuous fiber-reinforced polymer layer comprises a phenolic resin matrix and continuous spider silk fiber and carbon dispersed in the phenolic resin matrix; and
wherein the at least one of the layers of the plurality of coupled layers includes a fibrous material.

19. The method of claim 18, wherein the silk fibroin material includes at least one of a plurality of long fibers of varying lengths and a plurality of short fibers comprised of a variety of lengths, wherein the long fibers have lengths of more than 3 mm and the short fibers have lengths less than the shortest of any of the lengths of the plurality of long fibers.

20. The method of claim 19, wherein the long or short fibers include at least one of a silk fiber, a silk weave or cloth, and a silk mat.

21. The method of claim 18, wherein the plurality of coupled layers is an article of manufacture selected from a land vehicle frame, an air vehicle frame, a sea vehicle frame, a land vehicle panel, an air vehicle panel, and a sea vehicle panel.

22. The method of claim 21, wherein the article of manufacture includes at least one of a load-bearing structure, non-load-bearing structure, and a decorative or aesthetic structure.

23. A method of making a silk fibroin composite comprising:

feeding a silk fibroin material into an extruder, the silk fibroin material derived at least in part from expression of one or more spider silk genes in at least one living organism;

extruding a silk fiber precursor from the silk fibroin material;

passing the silk fiber precursor through a coagulation bath at one end of the coagulation bath;

forming a silk fiber from the silk fiber precursor through coagulation in the coagulation bath;

stretching at least a portion of the silk fiber using at least one set of godets;

combining at least a portion of the silk fiber with at least one non-silk polymer material to form a feedstock;

using the feedstock, forming a composite matrix using at least one of injection molding, reaction-injection molding, chopped-fiber injection, extrusion, molding, film casting, web coating, spray-coating, batch mixing, weaving, vacuum injection, and 3D printing;

forming a plurality of coupled layers wherein at least one of the layers includes at least a portion of the composite matrix, the plurality of layers further comprising:

at least one backing or surface layer and at least one layer including a substantially honeycomb-shaped core including a plurality of cells, wherein the honeycomb-shaped core comprises the silk fibroin material and, the substantially honeycomb-shaped core coupled to the at least one backing or surface layer with a continuous fiber-reinforced polymer layer, wherein the continuous fiber-reinforced polymer layer closes openings of the plurality of cells, and wherein the continuous fiber-reinforced polymer layer comprises a phenolic resin matrix and continuous spider silk fiber and carbon dispersed in the phenolic resin matrix; and wherein the at least one of the layers of the plurality of coupled layers includes a fibrous material.

24. The method of claim 23, wherein the composite matrix includes at least one of a plurality of long fibers of varying lengths and a plurality of short fibers comprised of a variety of lengths; and wherein the long fibers have lengths of more than 3 mm and the short fibers have lengths less than the shortest of any of the lengths of the plurality of long fibers.

25. The method of claim 24, wherein the long fibers make up 0.5 wt.% to 99 wt. % of the combined weight of the composite matrix.

26. The method of claim 23, wherein the honeycomb-shaped core includes at least one of an aluminum core, a foam core, a wood core, and a carbon-fiber core.

27. The method of claim 23, further comprising mixing the feedstock with another feedstock selected from a soap material, a cosmetic material, or a paint material.

* * * * *